(12) United States Patent
Voice

(10) Patent No.: US 8,224,858 B2
(45) Date of Patent: Jul. 17, 2012

(54) METHODS AND SYSTEM FOR INFORMATION STORAGE ENABLING FAST INFORMATION RETRIEVAL

(75) Inventor: Christopher Brian Voice, Ottawa (CA)

(73) Assignee: Engage Selling Solutions Inc., Ottawa (CA)

( * ) Notice: Subject to any disclaimer, the term of this patent is extended or adjusted under 35 U.S.C. 154(b) by 263 days.

(21) Appl. No.: 12/773,810

(22) Filed: May 4, 2010

(65) Prior Publication Data

US 2010/0281031 A1    Nov. 4, 2010

Related U.S. Application Data

(60) Provisional application No. 61/215,047, filed on May 4, 2009.

(51) Int. Cl.
*G06F 17/30* (2006.01)
(52) U.S. Cl. ....................... 707/791; 707/801
(58) Field of Classification Search ............... 707/791, 707/801
See application file for complete search history.

(56) References Cited

U.S. PATENT DOCUMENTS

| | | | |
|---|---|---|---|
| 5,063,444 A * | 11/1991 | Knauer et al. | 375/240.11 |
| 5,870,584 A * | 2/1999 | Bennett | 707/752 |
| 6,988,109 B2 * | 1/2006 | Stanley et al. | 1/1 |
| 7,370,054 B1 * | 5/2008 | Martin et al. | 707/747 |
| 7,577,665 B2 | 8/2009 | Ramer | |
| 7,702,639 B2 * | 4/2010 | Stanley et al. | 707/999.1 |
| 7,830,812 B2 * | 11/2010 | Atkins et al. | 370/252 |
| 7,904,080 B2 * | 3/2011 | Atkins et al. | 455/423 |
| 8,019,747 B2 * | 9/2011 | Srinivasan et al. | 707/713 |
| 8,036,937 B2 * | 10/2011 | Tang et al. | 705/14.46 |
| 8,103,655 B2 * | 1/2012 | Srinivasan et al. | 707/713 |
| 2010/0063877 A1 | 3/2010 | Soroca | |
| 2010/0082691 A1 | 4/2010 | Jaster | |

\* cited by examiner

*Primary Examiner* — Kim Nguyen
(74) *Attorney, Agent, or Firm* — IP-MEX Inc.; Victoria Donnelly

(57) ABSTRACT

Methods and apparatus for judicially storing information to enable fast information retrieval are disclosed. The information is organized in information fields each field having a respective set of information elements. Cells of information elements are defined and corresponding information records are cached. The cells may be user defined or formed based on affinity coefficients of pairs of information elements. With a large number of fields, each having a large number of information elements, cells are generated recursively. Each cell is associated with at least one pre-defined query.

27 Claims, 22 Drawing Sheets

METHODS AND SYSTEM FOR INFORMATION STORAGE ENABLING FAST INFORMATION RETRIEVAL

This application claims priority from U.S. Provisional Patent Application No. 61/215,047 filed on May 4, 2009.

FIELD OF THE INVENTION

The present invention relates to information storage and retrieval in computer-readable media. In particular, it is directed to a system and methods for fast retrieval of data-processing results in response to explicit or implicit queries.

BACKGROUND

In a web-based system with constrained resources, presenting information requested to a user with minimal response time is important; as latency increases, transactions may be subject to abandonment. Sophisticated content delivery mechanisms often rely on real-time submission of content requests that result in database queries for the requested content. As the database of content grows, the time required to process such queries increases. In addition, queries may be sophisticated, involving multiple criteria for determining content to be returned which also increases processing requirements.

Several caching approaches are well known in the art. Known caching algorithms improve performance by keeping a subset of possible query responses ready for immediate return in response to a corresponding query. A variety of mechanisms are employed, such as "recency" and "popularity", which rely on past query history.

There is, therefore, a need for a caching technique which appreciably reduces response time.

SUMMARY

The invention generally relates to a data processing system which includes a Data Query Processing Module which receives necessary inputs from the user via an input device such as a computer keyboard and mouse, or another processing system via an interface or data file, and produces the necessary outputs.

An object of the invention is to provide a Method for Data Retrieval using Pre-Defined Queries for individuals or organizations that minimizes query processing time by pre-populating a query results cache by determining query results for all pre-defined queries, thereby reducing processing time when actual queries are received. This has an advantage over existing data query processing methods because it makes query results available with less processing, hence less time and energy, in comparison with processing the queries at the time of query submission The processing effort and the storage requirement are reduced if all possible query results are predetermined and cached.

Another object of the invention is to provide a Method for Data Retrieval using Pre-Defined Queries that triggers an update of cache contents based on a number of factors including, but not limited to, the submission of new query, a change in database data, a specific schedule for updating and the manual request of an individual or other processing system. Thus, the method has the advantage over existing data query processing methods as it ensures that the response to Data Queries can be current while taking advantage of pre-defined queries.

A further object is to provide a Method for Data Retrieval using Pre-Defined Queries that allows reference to queries by a unique index versus the explicit query. This has the advantage, over existing data query processing methods, of permitting modification of the Pre-Defined query definition without requiring a change to the actual query used as it employs the index, thus having less impact on users or processing systems generating queries.

A still further object is to provide a Method for Data Retrieval using Pre-Defined Queries that allows a query to be used that refines the results of a Pre-Defined Query. This has the advantage, over existing data query processing methods, of enabling a new query to obtain results from within the set of records generated from a Pre-Defined Query. Processing effort is reduced because a relatively small set of records need to be reviewed by a query to produce the query results, These features allow individuals or organizations to retrieve information from a computer system by pre-defining specific queries to be used subsequently when retrieving data and using those pre-defined queries to optimize query processing. Query processing can be optimized by using the pre-definition to pre-build search results and, alone or in combination, providing a cache of processing results. Advantages include efficient processing because of the constraint that only those queries whose results have been pre-populated are considered. In addition, the pre-definition of queries allows new queries to be presented as a subset of a pre-defined query, which itself represents a processing advantage versus performing a new query without any pre-definition or caching.

In accordance with one aspect, the present invention provides an apparatus for judicially storing information of an information domain to enable fast information retrieval. The information is categorized into a number of fields, each field containing a respective set of elements. The apparatus comprises: a processor; a first memory device for storing the set of elements of the each field; a second memory device for storing user defined cells and respective affinity parameters, where each cell contains at least two elements belonging to at least two fields; a third memory device storing a first set of processor-readable instructions which causes the processor to sort the cells to produce an array of sorted cells according to a descending value of the affinity parameters; and a fourth memory device for storing the sorted cells and respective affinity parameters.

The third memory device further stores a second-set of processor-readable instructions which cause the processor to: acquire information records from information sources for each cell of the sorted cells, starting with a cell of a highest affinity parameter; hold the information records in auxiliary storage; transfer the information records from the auxiliary storage to the fourth memory device subject to an indication that a current vacancy of the fourth memory device exceeds a size of the information records.

The third memory device may also store instructions which cause the processor to: truncate the array of sorted cells so that only a cell having an affinity parameter exceeding a pre-defined affinity threshold is retained; organize storage in the fourth memory device to prevent duplicate acquisition of any of the information records; associate each user-defined cell with at least one query selected from a list of predefined queries.

The third memory device may also hold instructions which cause the processor to associate indices with the information records and determine indices of information records corresponding to each cell. Indices of information records corresponding to a cell containing a relatively large number elements may be derived from intersection of indices of information records corresponding to cells each having fewer elements.

In accordance with another aspect, the present invention provides an apparatus for judicially storing information to enable fast information retrieval. The apparatus comprises: a processor; a first memory device storing information elements arranged into fields where each field contains information elements of a predefined type; a second memory device storing affinity coefficients of pairs of the information elements; a third memory device storing processor-readable instructions; and a fourth memory device for storing cell descriptors and information records, where a cell descriptor indicates, for a respective cell, a number of elements, an affinity parameter, and pointers to relevant information records.

The instructions cause the processor to recursively form cells of cell-orders varying from two to a specified limit, each cell having an affinity parameter exceeding a predefined affinity threshold and sort cells of same order in a descending order of affinity parameters. The instructions also cause the processor to acquire information records corresponding to each cell and store the information records in the fourth memory device.

The third memory device may store further instructions which cause the processor to perform at least one of the following functions: (1) associate each formed cell with at least one query selected from a list of predefined queries; (2) determine information records corresponding to a cell of a specific order greater than 2, as intersections of information records of cells of lower order, thereby further reducing storage requirements; and (3) monitor occupancy of the fourth memory device and, where the occupancy reaches a specified occupancy limit, delete information records of lowest affinity parameters.

In accordance with a further aspect, the present invention provides a method, implemented by a processor, of judicially storing information in a processor-readable medium. The stored information belongs to an information domain selected from a plurality of information domains. The method comprises: defining a set of information fields of the information domain; identifying a set of elements within each information field in the set of information fields; and determining affinity coefficients of at least two elements belonging to at least two fields.

A set of second-order cells, each containing two elements, is then generated. An affinity parameter of each second-order cell is determined as an affinity coefficient of the two elements.

The set of second-order cells may be pruned to produce a pruned second-order cell set containing accepted second-order cells each of an affinity parameter exceeding a predefined affinity threshold.

Information records corresponding to each accepted second-order cell are then acquired from local or external sources. Information records corresponding to a cell of order $v$, $v$ being the number of constituent elements of a cell, are herein called $v$-order information records. The second-order information records, together with an identifier of each accepted second-order cells, and a respective affinity parameter in the processor-readable medium.

The method further comprises creating a third-order cell containing a specific cell and a specific element, where the specific element is selected from a specific information field and the specific second-order cell is selected from the pruned second-order cell set. The third-order cell is accepted if its affinity parameter exceeds the predefine affinity threshold.

A first affinity coefficient of the specific element and a first element of the specific cell, and a second affinity coefficient of the specific element and a second element of the specific cell, are determined. The affinity parameter of the third-order cell is the least value of the first affinity coefficient, the second affinity coefficient, and an affinity parameter of the specific second-order cell.

If the third-order cell is accepted, third-order information records corresponding to the third-order cell are acquired and stored, together with identifiers of the third-order cell and the affinity parameter of the third-order cell, in the processor-readable medium.

In general, the process of creating higher-order cells, starting with the second-order cells, is performed recursively for all $v$-order cells, $1 < v \leq \Omega$, $\Omega$ being a predefined limit of $v$. Starting with $v=2$, specific elements from specific information fields among the set of information field are selected, and for each specific element, a respective proximity to each $v$-order cell is computed.

Where the respective proximity exceeds the predefined affinity threshold, a $(v+1)$-order cell containing a $v$-order cell and an element is created. The affinity parameter of the $(v+1)$-order cell is determined as a lesser value of the proximity and an affinity parameter of the $v$-order cell.

Information records corresponding to the $(v+1)$-order cell are acquired from local or external sources and stored, together with identifiers of the $(v+1)$-order cell, and the affinity parameter of the $(v+1)$-order cell, in the processor-readable medium;

BRIEF DESCRIPTION OF THE DRAWINGS

Embodiments of the present invention will be further described with reference to the accompanying exemplary drawings, in which.

DETAILED DESCRIPTION

Terminology

Figure 1:
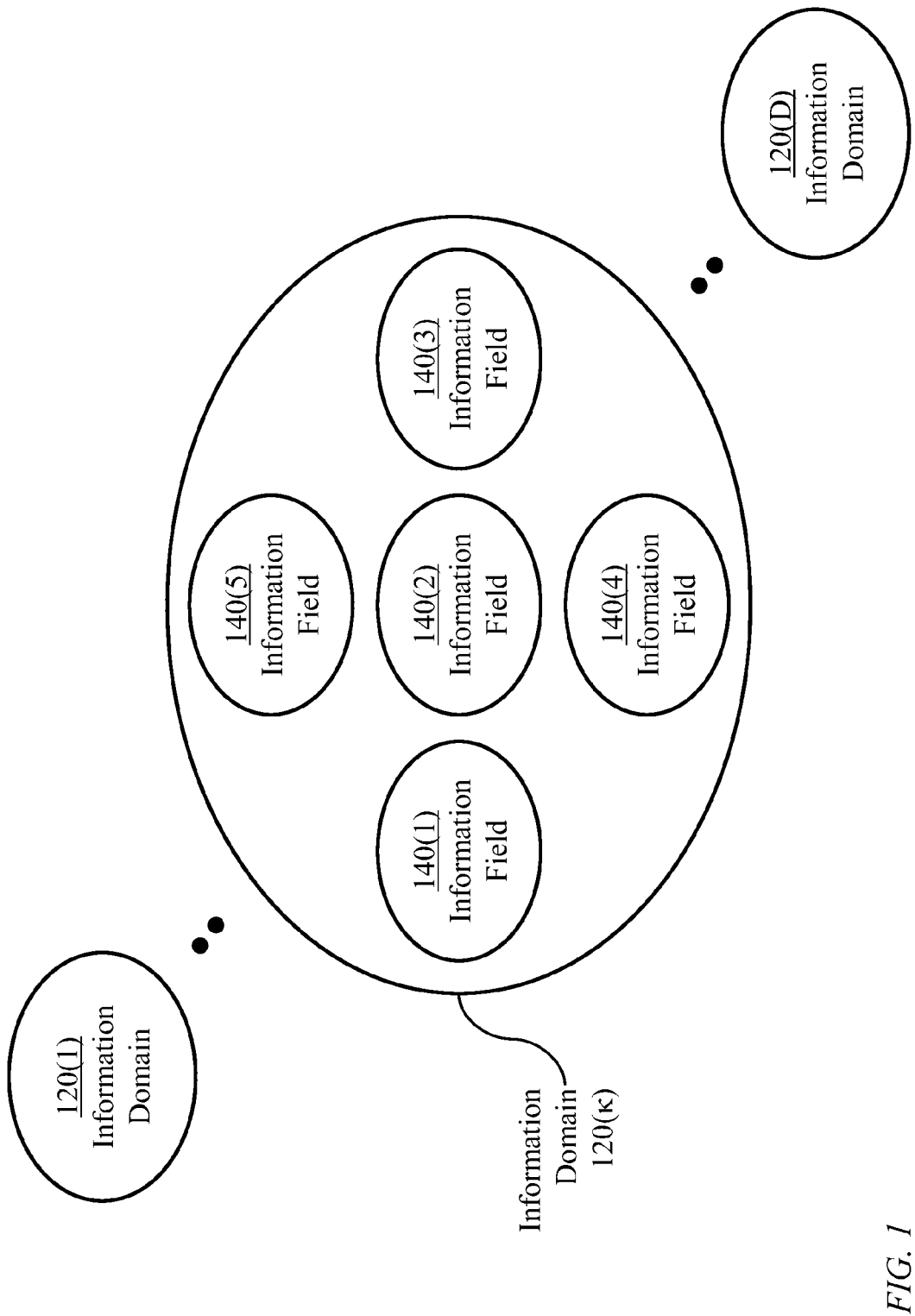
FIG. 1 illustrates an information universe partitioned into information domains, in accordance with an embodiment of the present invention.

Information Universe: The term refers to all information of interest to a particular community of users and may have a wide scope.

Information domain: An information domain is a division of the information universe which contains information perceived to be more closely related.

Information field: An information domain may further be partitioned into information fields, each information field containing information perceived to be of a same type. For example, "metals" may belong to one field while "fluids" may belong to another field. An information field is referenced herein as "field" for brevity.

Information element: The term refers to individual components of a field.

Information cell: An information cell contains two or more information elements belonging to one or more fields. An information cell is referenced as "cell", for brevity.

Cell order: A cell containing v elements, v>1, is referenced as a cell of order v, or a v-order cell. Although a cell contains more than one element, computational methods used herein may initialize a cell as having one element to which new elements are added successively according to some rules.

Information records: Information relevant to content of a cell is acquired from information sources in the form of at least one information record. An information record may be a text, a still image, an audio recording, or a video recording. An information record is referenced as "record", for brevity.

Information-record order: Information records corresponding to a cell of order v, v>1, may be referenced as v-order information records, or v-order information records.

Affinity coefficient: An "affinity coefficient", denoted $\theta$, quantifies mutual relevance of two elements. The coefficient may be based on perception or analysis of relevant statistical data. An affinity coefficient of an element "A" with respect to an element "B" is the same as the affinity coefficient of element "B" with respect to an element "A".

Proximity: The term "proximity" is used herein to denote a measure of affinity between a specific element and a cell containing a number of elements. Proximity is quantified as the least value of affinity coefficients of the specific element with respect to the constituent elements of the cell. Thus, if the affinity coefficients of the specific element relative to elements of a cell having five elements are 0.80, 0.64, 0.95, 0.50, 0.90, the proximity of the specific element to the cell is 0.50.

Affinity parameter: An "affinity parameter", denoted $\alpha$, of a cell containing a number of elements is the minimum affinity coefficient for any two elements within the cell. The affinity parameter of a cell of order 2 equals the affinity coefficient of the two elements forming the cell.

Cell descriptor: A cell descriptor indicates a number of elements in a cell, an affinity parameter of the cell, and pointers to relevant information records in a storage medium.

Affinity matrix: The term refers to a matrix containing affinity coefficients of elements of two fields. An entry in the matrix represents an affinity coefficient of two elements, one from each of the two fields.

Auto-affinity matrix: An auto-affinity matrix contains affinity coefficients of each pair of elements of the same field.

Affinity array: When an information domain is divided into a large number of fields with each field having a respective large number of elements, affinity matrices may be sparse matrices with a majority of entries being of no interest and set to a value of zero. In such case, the content of an affinity matrix is more efficiently stored as an affinity array.

FIG. 1 illustrates an information universe 100 divided into a number D, D>1, of information domains 120, individually referenced as 120(1) to 120(D). Each information domain comprises information elements which may be grouped into information fields, each information field having information elements of comparable types. An exemplary information domain 120($\kappa$), $1 \leq \kappa \leq D$, has five fields 140, individually referenced as 140(1) to 140(5).

Figure 2:
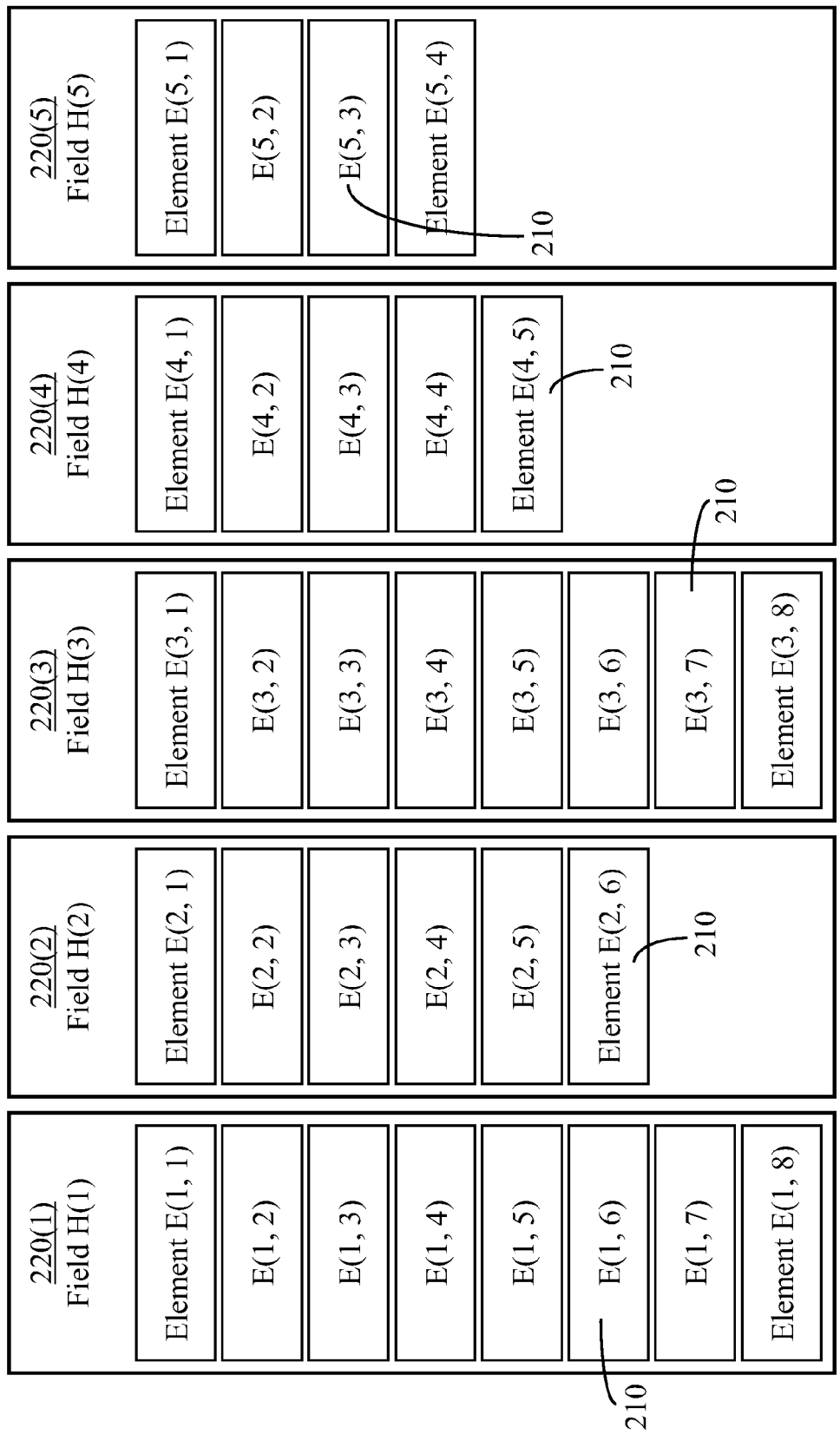
FIG. 2 illustrates categorizing an information domain, from among the information domains of FIG. 1, into a plurality of fields, each field comprising a corresponding set of cohesive information elements, in accordance with an embodiment of the present invention.

The information fields of an information domain may contain different numbers of information elements. For example, the information fields 140(1) to 140(5) of information domain 120($\kappa$) may respectively contain 8, 6, 8, 5, and 4 information elements 210 as illustrated in FIG. 2. The fields 140 are indexed as 1 to 5 and labeled in FIGS. 2 as H(1) to H(5), with each information element 210 also labeled as E(j, k), where j indicates a field index and k indicates a position of an information element within a field. An information element is hereinafter referenced as an "element" for brevity.

An example of an information domain may be one associated with sales of a product on the web. In which case, information fields would be associated with content to be delivered to prospective customers while they are on particular web pages on a web site. The list below provides exemplary information fields 140 of an information domain 120, along with respective elements 210:

{Product—Product A, Product B, Product C, etc.},
{Customer Location—United States, Canada, England, etc.},
{Company Size—small, medium, large}, and
{Company Industry—government, manufacturing, financial services, etc.}.

Figure 3:
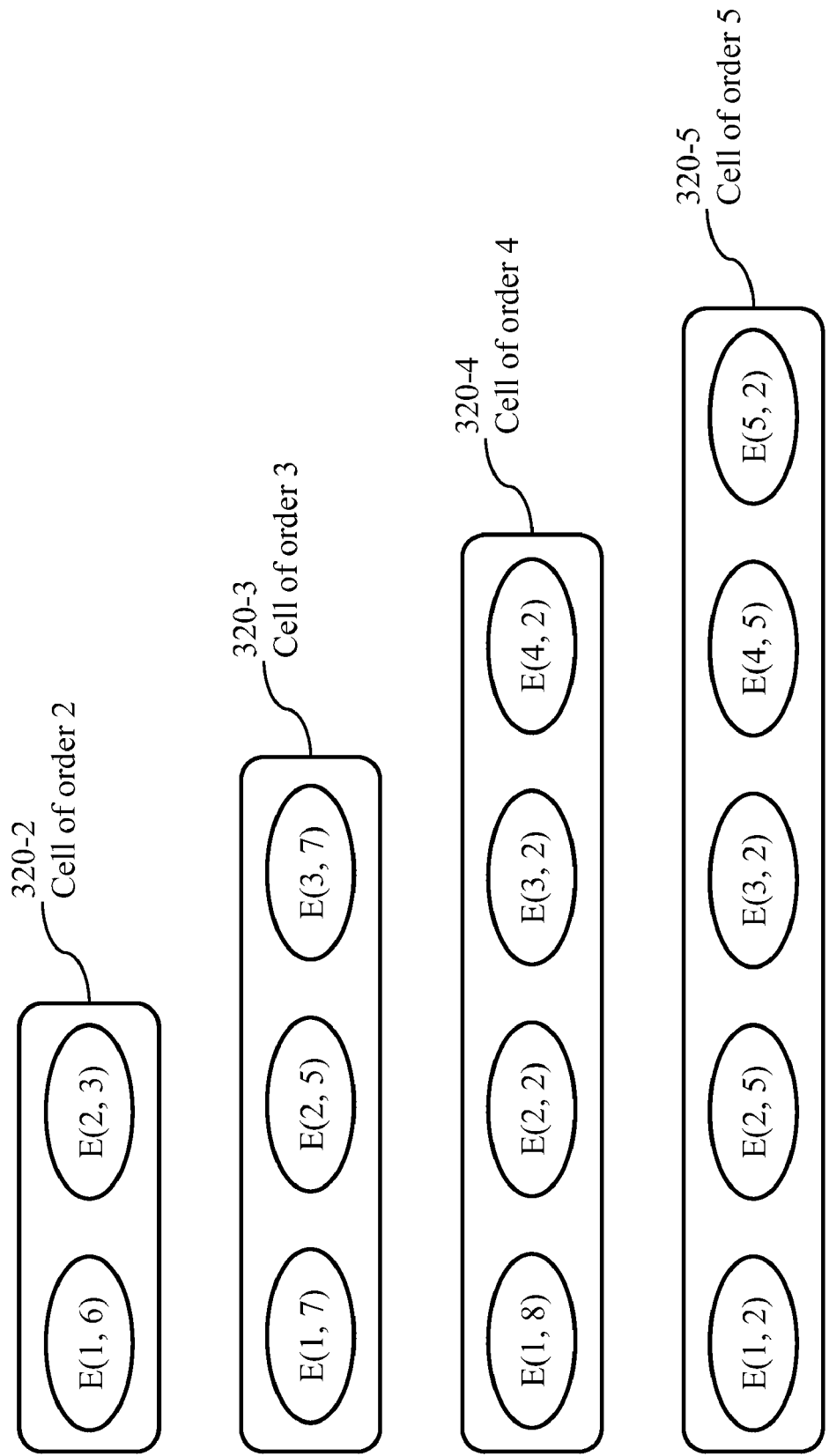
FIG. 3 illustrates a cell of order $v$, $v>1$, containing $v$ information elements, for use in an embodiment of the present invention.

A set of two or more information elements belonging to one or more fields forms an information cell, hereinafter referenced as "cell", for brevity. A cell containing ν elements is referenced as a cell of order ν. FIG. 3 illustrates a cell of order 2, containing: two elements E(1,6) and E(2, 3); a cell of order 3 containing elements E(1, 7), E(2, 5), and E(3, 7); a cell of order 4 containing E(1, 8), E(2, 2), E(3, 2), and E(4, 2); and a cell of order 5 containing elements E(1, 2), E(2, 5), E(3, 2), E(4, 5), and E(5, 2).

It may be desirable to store cells in a computer-readable medium for a variety of reasons. However, in a typical information domain, the number of cells of different orders can be too large.

An element in an information domain may have conjunction or compatibility with one set of elements but may have nothing in common with another set of elements. This property may be exploited to eliminate a significant proportion of cells which may contain incompatible elements. In the following, the term "affinity" is used to refer to a degree of cohesion of two or more elements. An "affinity coefficient", denoted θ, of two elements quantifies mutual relevance of the two elements. The coefficient may be based on perception or analysis of relevant statistical data. An "affinity parameter", denoted α, of a cell containing a number of elements is the minimum affinity coefficient for any two elements within the cell. The affinity parameter of a cell of order 2 equals the affinity coefficient of the two elements forming the cell. The system of information storage in accordance with the present provides information records corresponding to cells of different orders. A cell of any order is retained only if the affinity coefficient of each pair of elements exceeds a pre-defined threshold Θ*. A cell of order ν, ν>2, may be constructed starting from a cell of order 2 having an acceptable affinity coefficient. A new element is added to the cell if the resulting affinity parameter exceeds the predefine threshold. In constructing the cell of order greater than 2, the cells of lower order, each having a sufficient affinity parameter, are individually considered and corresponding information records are stored.

Figure 4:
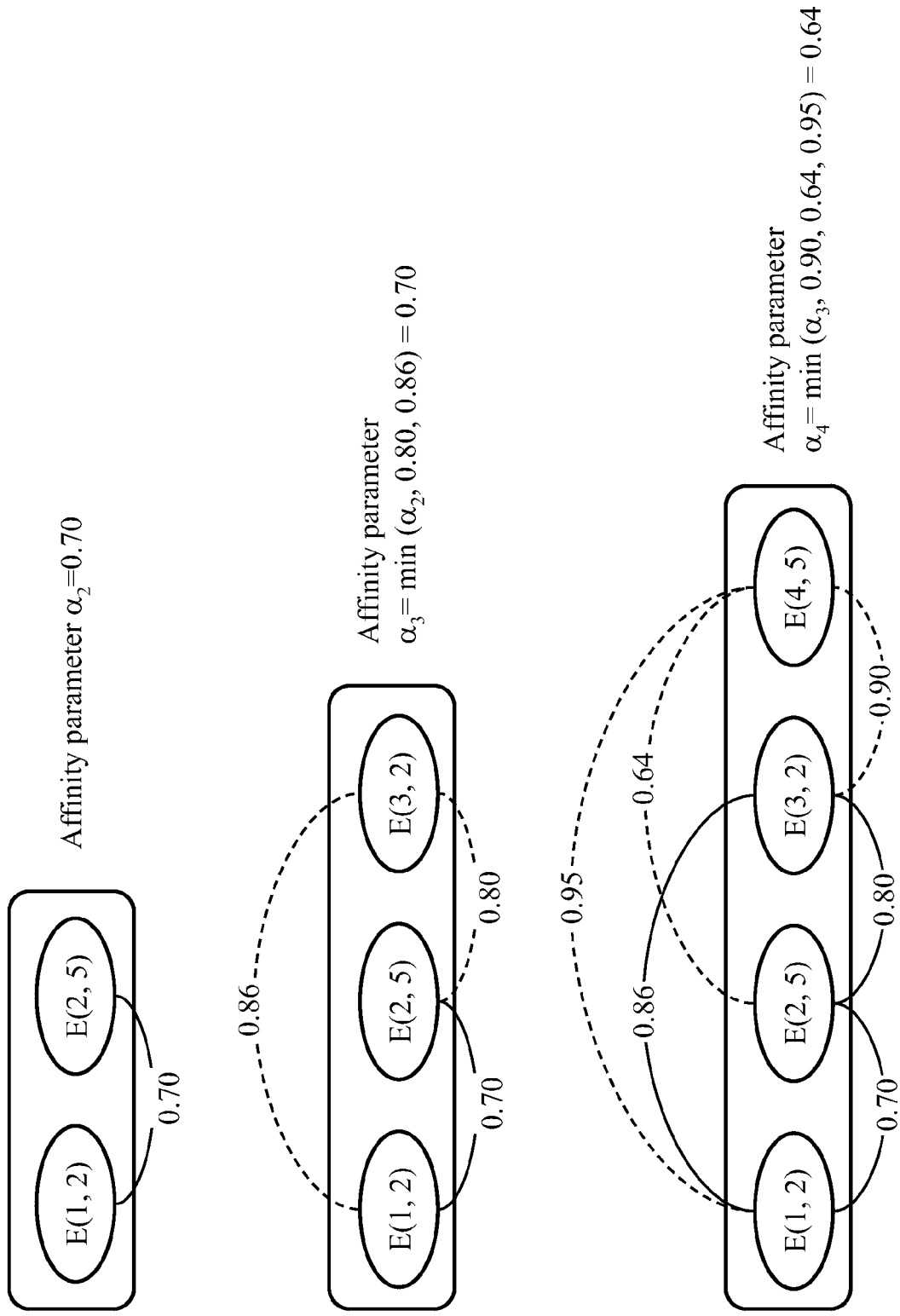
FIG. 4 illustrates a cell having a number of information elements of different pair-wise affinity coefficients, for use in an embodiment of the present invention.

FIG. 4 illustrates a method of recursively determining the affinity coefficient of a cell containing a large number of cells. A cell 420-2 of order 2 containing elements E(1, 2) and E(2,5) of an affinity coefficient of 0.7 is selected. The affinity parameter of cell 420-2 is $\alpha_2$=0.7. A cell 420-3 of order 3 is derived from cell 420-2 by adding element E(3, 2). Element E(3, 2) has affinity coefficients of 0.80 and 0.86 with respect to elements E(2, 5) and E(1, 2), respectively. The affinity parameter of cell 420-3 is then determined as $\alpha_3$=min ($\alpha_2$, 0.8, 0.86) =0.70. A cell 420-4 of order 4 is derived from cell 420-3 by adding element E(4, 5). Element E(4, 5) has affinity coefficients of 0.90, 0.64, and 0.95 with respect to elements E(3, 2), E(2, 5) and E(1, 2), respectively. The affinity parameter of cell 420-4 is then determined as $\alpha_4$=min ($\alpha_3$, 0.9, 0.64, 0.95) =0.64. If the pre-defined affinity threshold Θ* is 0.6, for example, then the three cells 420-2, 420-3, and 420-4 will be treated as separate entities and information records corresponding to each of the three cells would be acquired.

Figure 5:
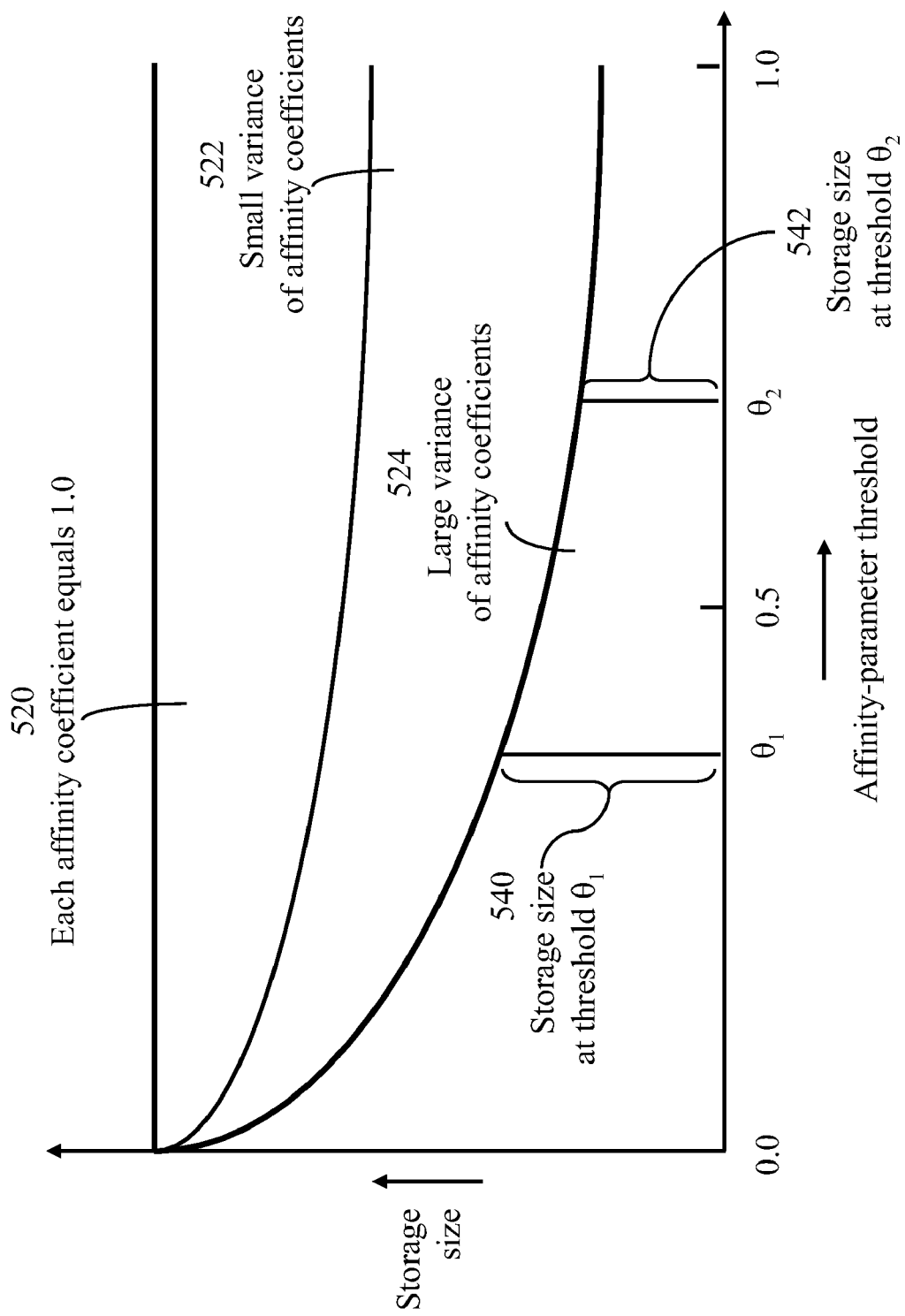
FIG. 5 illustrates dependence of information-record storage requirement on the value of an affinity-parameter threshold adjusted to prune cells, for use in an embodiment of the present invention.

FIG. 5 illustrates the storage required to hold queries and information records as a function of the affinity threshold Θ*. The largest affinity coefficient is set to equal 1.0. If each information-element pair has an affinity coefficient of 1.0 (reference numeral 520), then setting an affinity threshold would have no effect on storage requirements and the required storage need be sufficient to accommodate all presented cells and corresponding information records. With affinity coefficients which differ from one element pair to another, the affinity parameters of a proportion of cells may drop to insignificant values. This is specially the case for cells of large order, containing—for example—five or more elements each. Information records specific to cells having affinity parameters equal to or less than affinity threshold Θ* are not retained.

With affinity coefficients of relatively small variance (reference numeral 522), a proportion of cells would not be considered. As the value of the specified affinity threshold Θ* increases, fewer cells are accepted resulting in less storage requirement.

With affinity coefficients of relatively large values (reference numeral 524), a large proportion of cells would not be considered and the storage requirement drops rapidly with increasing Θ*. As illustrated in FIG. 5, the storage size corresponding to an affinity threshold $\theta_1$ can be reduced by increasing the affinity threshold to $\theta_2$.

Figure 6:
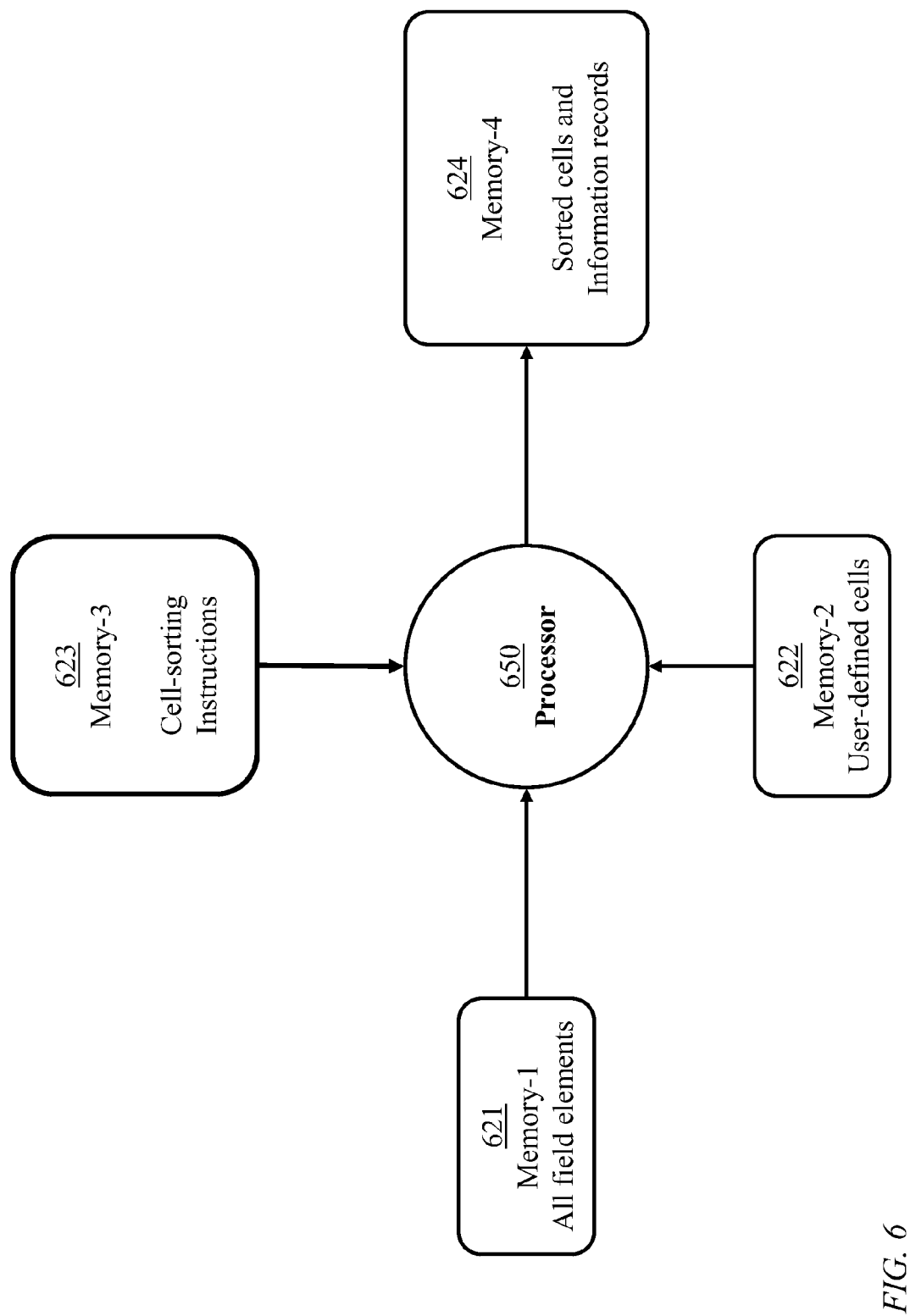
FIG. 6 illustrates an apparatus for selective information storage based on user-specified cells, in accordance with an embodiment of the present invention.

FIG. 6 illustrates an apparatus for information storage based on user-defined cells. The system comprises a processor 650, a memory device 621 storing user-defined elements of a selected information domain 120, a memory device 623 storing processor-executable instructions, a memory device 622 storing identifiers of user-defined cells each specifying a number of elements and an identifier of each element. In accordance with one embodiment, an affinity parameter of a cell is provided by the user. In another embodiment, a table of affinity coefficients is provided and an affinity parameter of a user-defined cell is computed. The user-defined cell is validated and admitted only if the computed affinity coefficient exceeds a pre-defined threshold.

The instructions of memory device 623 cause the processor to sort the admitted user-defined cells according to cell order and, for each cell order, according to affinity parameters. The sorted user-defined cells, together with corresponding information records, are stored in memory device 624.

Memory device 623 may store instructions which cause the processor 650 to acquire information records from information sources for each user-defined cell, starting with a cell of a highest affinity parameter. In order to ensure that information records corresponding to cells of high affinity parameters can be accommodated in memory device 624, given a constrained storage capacity of memory device 624, all acquired information records are preferably held in an auxiliary storage medium of high capacity. If the size of all acquired information records does not exceed the storage capacity of memory device 624, then all information records are transferred from the auxiliary storage medium to memory device 624. However, if the size of all acquired information records exceeds the storage capacity of memory device 624, then information records may selectively be transferred from the auxiliary storage to memory device 624.

Memory device 623 may store instructions which cause the processor 650 to organize storage in memory device 624 so that each information record is associated with a unique index and an information record may be associated with multiple cells. This prevents duplicate acquisition, or storage, of information records.

Memory device 623 may also store instructions which cause the processor 650 to determine intersections of indices of information records corresponding to cells having less than ν elements each, where ν is less than a specified limit, to produce indices of information records corresponding to cells each having at least ν elements. For example, common information records corresponding to two cells of order 4 may serve as information records corresponding to a cell of order 5.

The apparatus of FIG. 6 may also comprise a memory device (not illustrated) storing a list of pre-defined queries.

Figure 7:
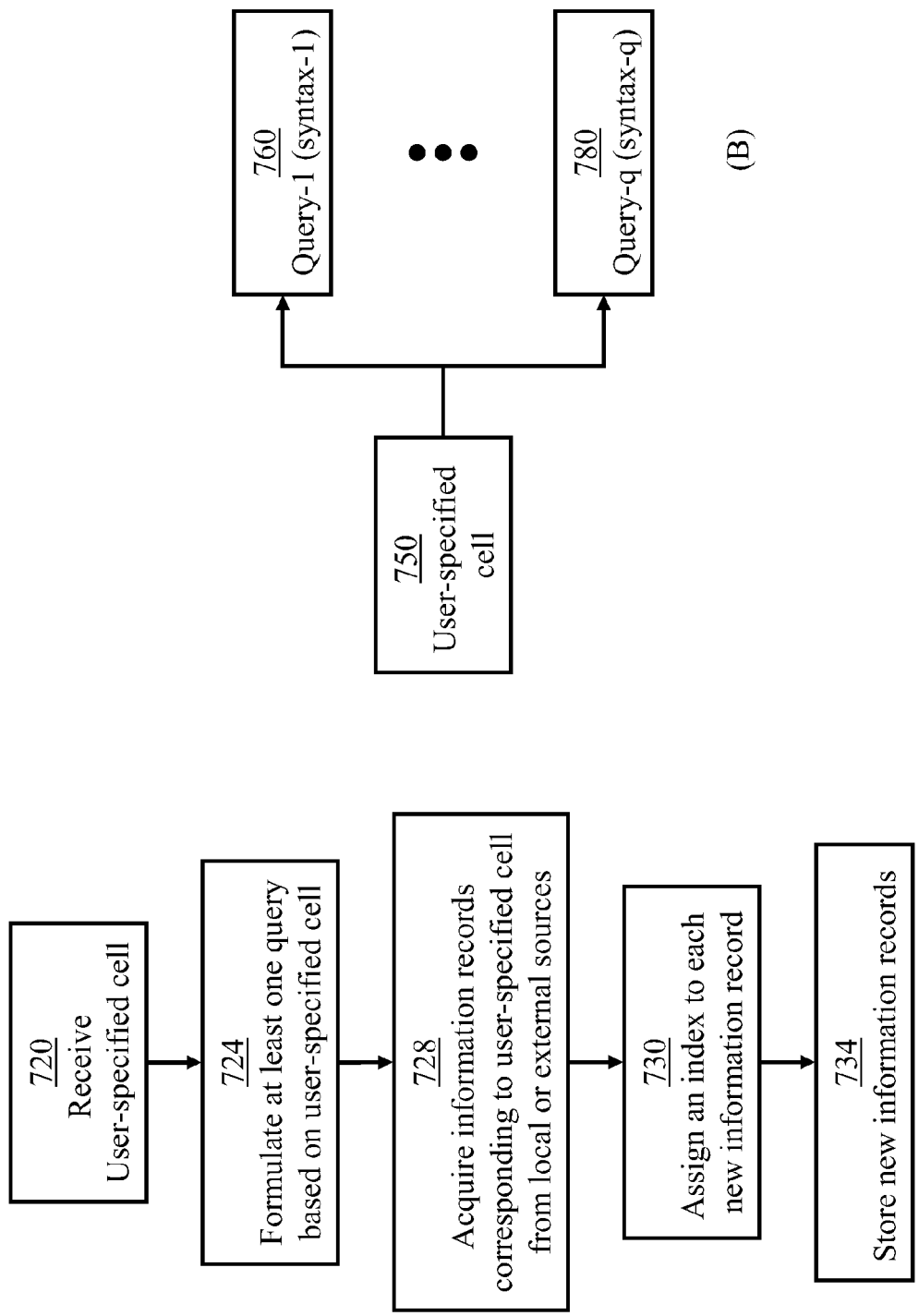
FIG. 7 illustrates a process of acquiring and storing information records corresponding to pre-defined queries, in accordance with an embodiment of the present invention.

FIG. 7 illustrates a process implemented by processor 650 for acquiring and storing information records corresponding to pre-defined queries.

Received user-specified cells (step 720) are placed in memory device 622. At least one query is formulated to correspond to each cell (step 724). Memory device 623 has stored thereon instructions which cause processor 650 to acquire information records from local or external sources (step 728). An acquired record may be included in a response to more than one query associated with more than one cell. Thus, each new information record is assigned a respective unique index (step 730) and the new information record is stored in memory 624 (step 734).

Each cell has a respective unique index. However, several queries of different syntax may be associated with one cell. As illustrated in FIG. 7, a number q, q>1, of queries (reference numerals 760 to 780), labeled (query-1 of syntax-1, . . . , query-q of syntax q) correspond to a single user specified cell 750.

A user may explicitly submit a query. Alternatively, the user may implicitly trigger a pre-defined query. In one application, queries can be embedded in a web page so that when a user browses to select a particular page or select a specific link, a pre-defined query is triggered. For example, selecting a page on a particular product would trigger a query to return specific content related to the product.

A more sophisticated implementation may take information about a session, such as the location of a user based on IP address, and combine it with a query encoded on the page. For example, selecting a page on a particular product with the browser located in a selected geographic location would trigger a query to return specific content related to the product that is specific to customers residing in the selected geographic location.

Figure 8:
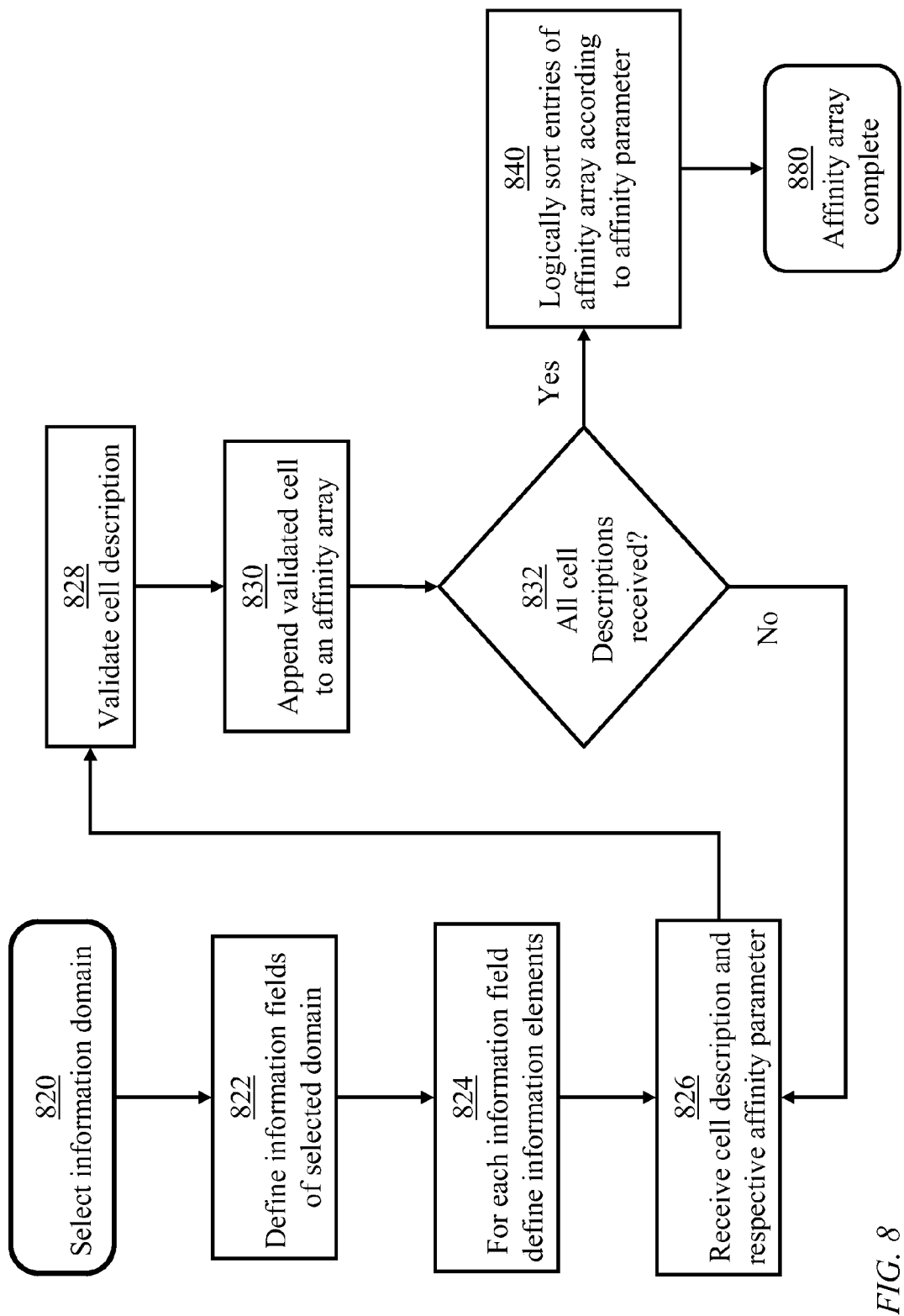
FIG. 8 is a flow chart illustrating a method of selective information storage based on specifying cell arrays, in accordance with an embodiment of the present invention.

FIG. 8 is a flow chart illustrating a method of selective information storage used in the system of FIG. 6. In step 820, an information domain 120 is selected. In step 822 information fields 210 of the selected information domain are acquired. The information fields may be entered by a user, or imported from an external database. In step 824, information elements are acquired either from direct user input or from an external database. In step 826, user-defined cell descriptions are stored in memory device 622 together with respective affinity parameters which may be provided by a user or computed based on known affinity coefficients of pairs of elements. Step 828 validates user-defined cells and step 830 appends validated user-defined cells to an affinity array. Step 832 instructs processor 650 to continue executing step 826 and, when all user-defined input is received, step 832 instructs processor 650 to execute instructions which logically sort entries of the affinity array (step 840) according to the affinity parameters or another criterion. An array of cells having affinity parameters each exceeding the predefined affinity threshold is then stored (step 880).

The method illustrated in FIG. 8 may be implemented in a special-purpose apparatus or in a general-purpose computing device.

Figure 9:
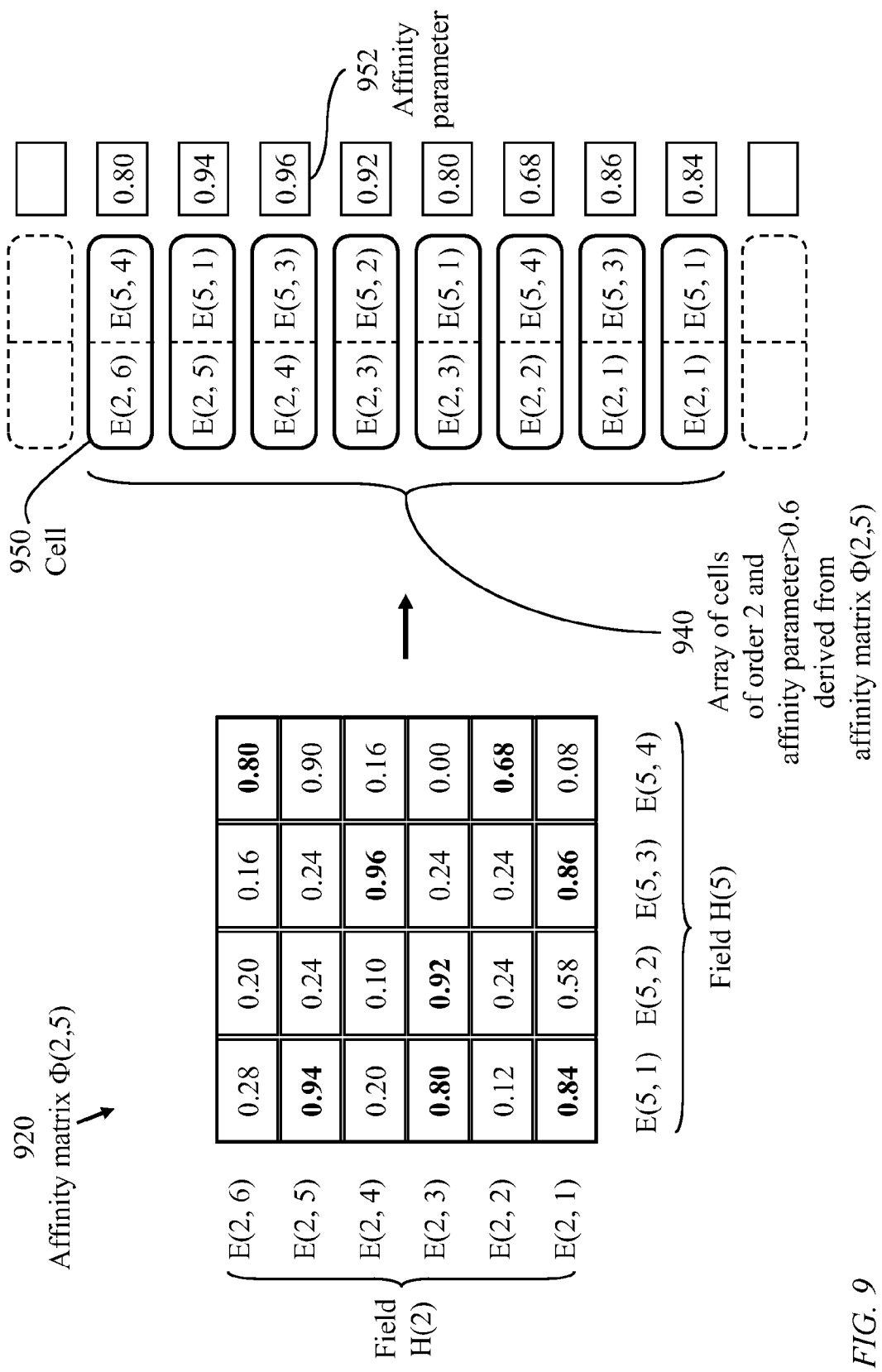
FIG. 9 illustrates an affinity matrix of a pair of fields selected from among a plurality of fields of a selected information domain, and a corresponding affinity array having second-order cells, each second-order cell having two elements of an affinity coefficient exceeding a predefined threshold, in accordance with an embodiment of the present invention.

FIG. 9 illustrates an affinity matrix 920, $\Phi(2, 5)$, indicating affinity coefficients of each pair of elements 210 selected from fields H(2) and H(5) of FIG. 2. Element pairs each having an affinity coefficients exceeding an affinity threshold $\Theta^*$ of 0.6 are selected and placed in an affinity array 940. An affinity coefficient 952 of each selected element pair is also indicated in affinity array 940.

Figure 10:
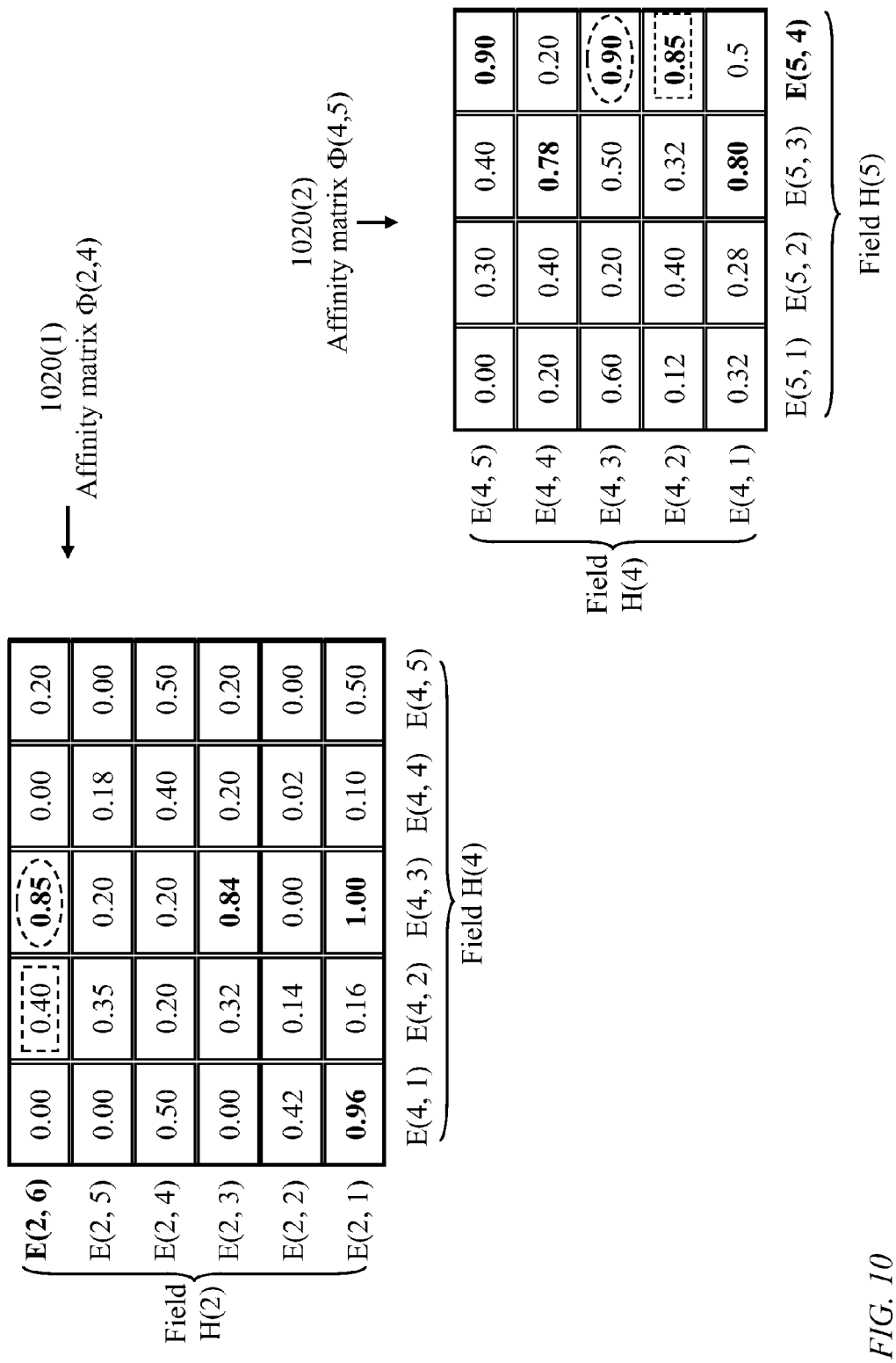
FIG. 10 illustrates two affinity matrices, each for a respective pair of fields.

FIG. 10 illustrated an affinity matrix $\Phi(2, 4)$, corresponding to fields {H(2), and H(4)}, and an affinity matrix $\Phi(4, 5)$ corresponding to field pairs {H(4) and H(5)}. Entries of the two matrices are used in FIG. 11.

Figure 11:
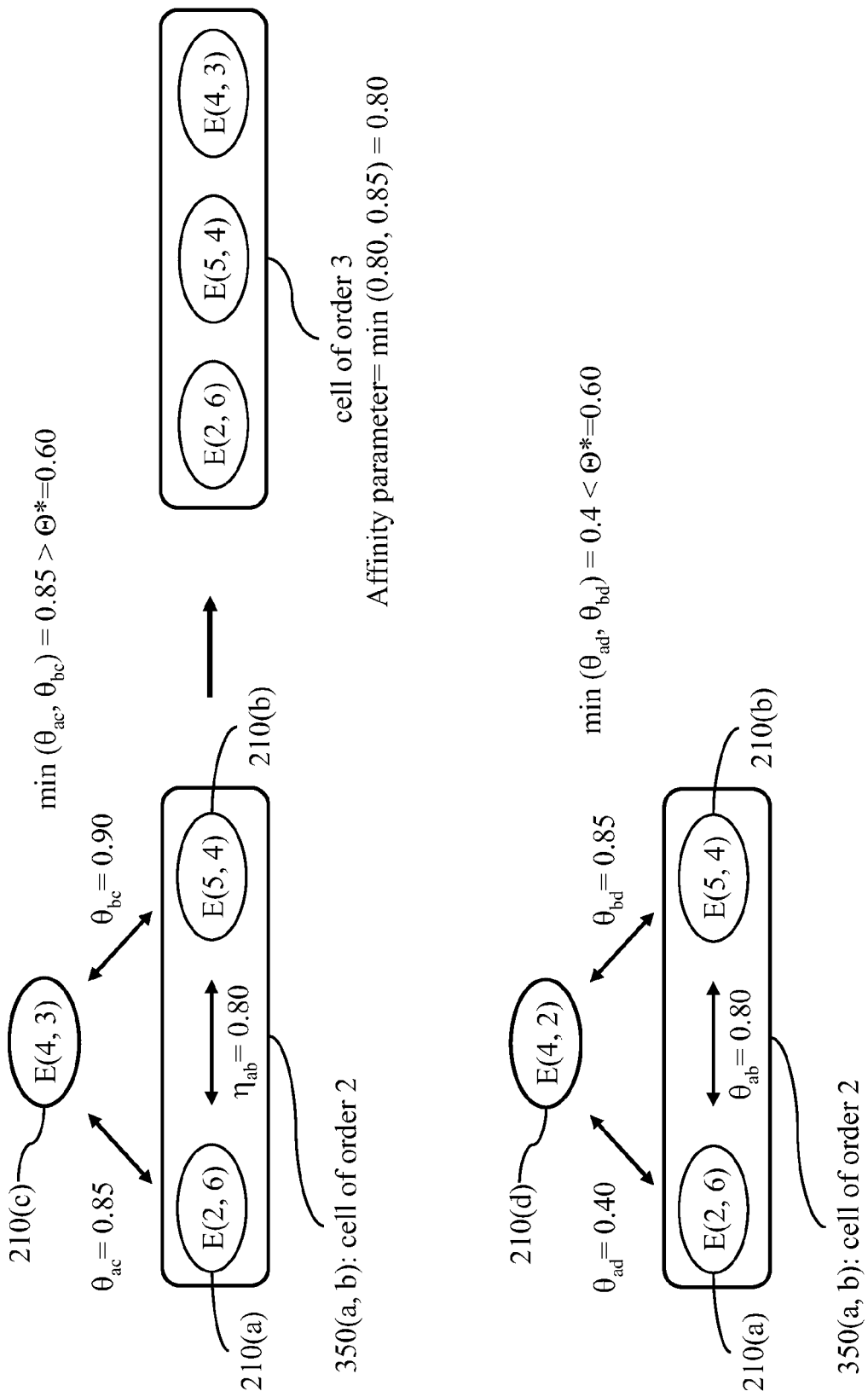
FIG. 11 illustrates generating a third-order cell combining an information element and a second-order cell, in accordance with an embodiment of the present invention.

FIG. 11 illustrates a second order cell 350(a, b) containing two elements 210(a) and 210(b) of an affinity coefficient $\theta_{ab}=0.80$. Element 210(a), labeled E(2,6), is the sixth element of field H(2) and element 210(b), labeled E(5, 4) is the fourth element of field H(5). An affinity threshold $\Theta^*$ is set to be 0.60. An element 210(c), labeled E(4, 3), has an affinity parameter, $\theta_{ac}$, with respect to element 210(a) determined from affinity matrix $\Phi(2, 4)$ of FIG. 10 as $\theta_{ac}=0.85$, and an affinity parameter, $\theta_{bc}$, with respect to element 210(b) determined from affinity matrix $\Phi(4, 5)$ of FIG. 10 as $\theta_{bc}=0.90$. The affinity parameter of a third order cell containing cell 350(a, b) and element 210(c) is determined as $\alpha=\min(\theta_{ab}, \theta_{ac}, \theta_{bc})=0.80>\Theta^*$. The resulting third order cell is then permitted. Repeating the same process with element 210(d) yields an affinity parameter $\alpha=\min(\theta_{ab}, \theta_{ad}, \theta_{bd})=0.40<\Theta^*$. The resulting third order cell is then discarded.

Figure 12:
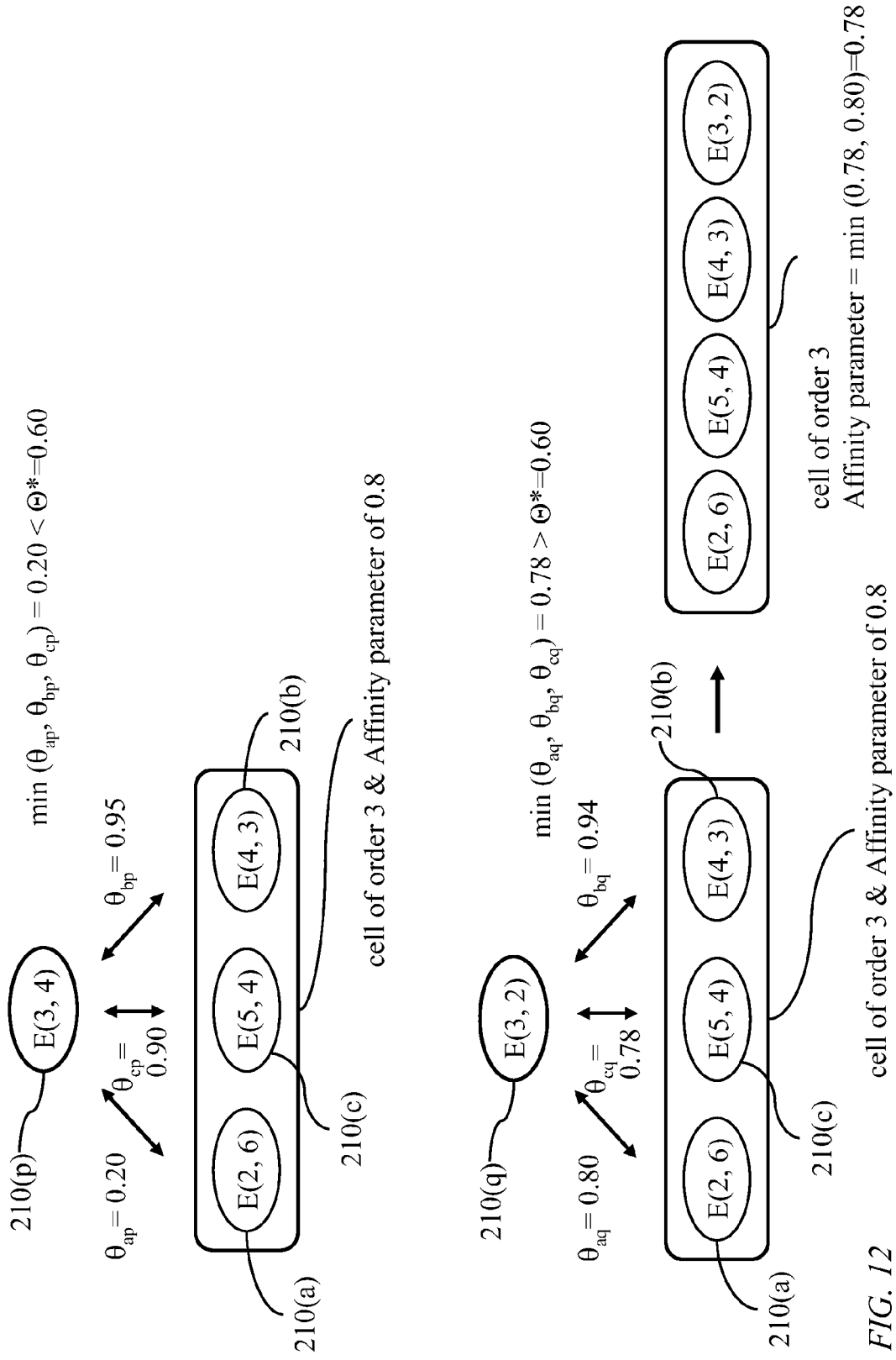
FIG. 12 illustrates generating a fourth-order cell combining an information element and a third-order cell, in accordance with an embodiment of the present invention.

FIG. 12 illustrates a process of appending a new element to the third order cell formed in FIG. 11, which contains the three elements 210(a), 210(b), and 210(b) and having an affinity parameter $\Theta$ of 0.80, to form a candidate fourth order cell. Element 210(p), of coordinates E(2,6), has affinity coefficients $\theta_{ap}$, $\theta_{bp}$, and $\theta_{cp}$ with respect to the three constituent elements 210(a), 210(b), and 210(c) of 0.20, 0.95, and 0.90, respectively. The affinity parameter of the candidate fourth order cell is then $\alpha=\min(0.80, 0.20, 0.95, 0.90)=0.20<\Theta^*$. The candidate fourth order cell is then discarded. Repeating the same process with element 210(q) of coordinates E(3,2) yields an affinity parameter $\alpha=0.78>\Theta^*$ and the resulting fourth order cell is admitted.

Figure 13:
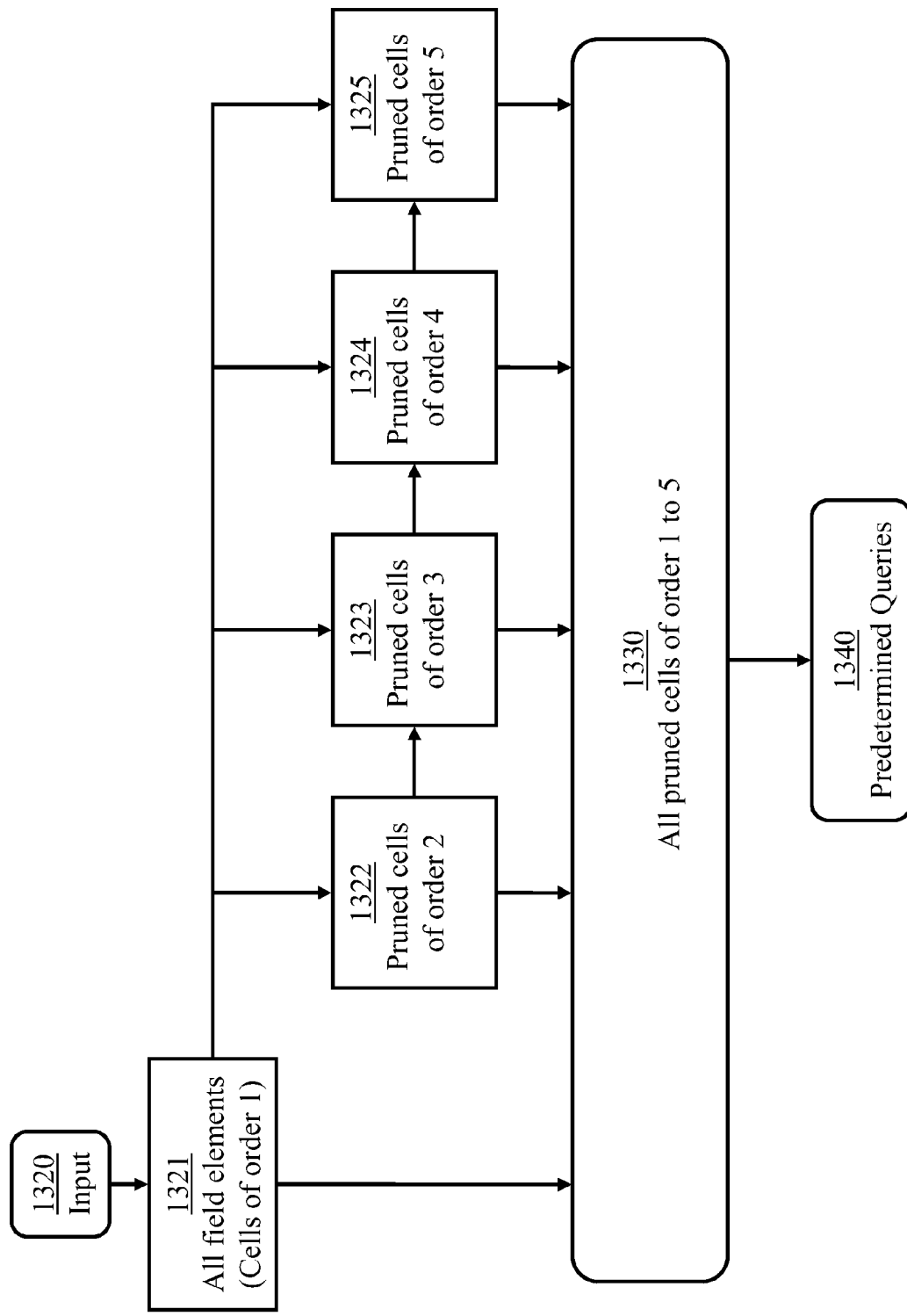
FIG. 13 illustrates successive generation of pruned cell arrays of ascending order, in accordance with an embodiment of the present invention.

FIG. 13 illustrates a process of successive generation of pruned cell arrays of ascending order. In step 1320, a user specifies fields and corresponding elements. In step 1321, elements are arranged in arrays as illustrated in FIG. 2. For uniformity, the individual elements are treated as cells of order 1 to facilitate devising a recursive process for constructing cells of higher order.

In step 1322, each element is considered for merger with each cell of order 1, i.e., merger with other elements, to form a second order cell. Each resulting second order cell having an affinity parameter $\alpha$ exceeding a predefined threshold $\Theta^*$ is retained and added to an array of pruned cells of order 2.

In step 1323, each element is considered for merger with each retained cell of order 2. Each resulting third order cell having an affinity parameter $\alpha$ exceeding the predefined threshold $\Theta^*$ is retained and added to an array of pruned cells of order 3.

Likewise, pruned cells of order 4 are generated in step 1324, using elements of all fields and the array of pruned cells of order 3, and added to an array of pruned cells of order 4. Pruned cells of order 5 are generated in step 1325, using elements of all fields and the array of pruned cells of order 4.

The elements of all fields and the arrays of pruned cells of order 2 to 5, together with respective affinity parameters, are combined in step 1330 to be used in step 1340 for formulating predetermined queries. The affinity parameters of cells of order 2, 3, 4, or 5 are determined in steps 1322 to 1325. An affinity parameter of a cell of order 1 is meaningless, but for computational purposes may be set to equal 1.0. A user, however, may assign a prominence parameter to each element to be used in modifying affinity coefficients of element pairs.

Figure 14:
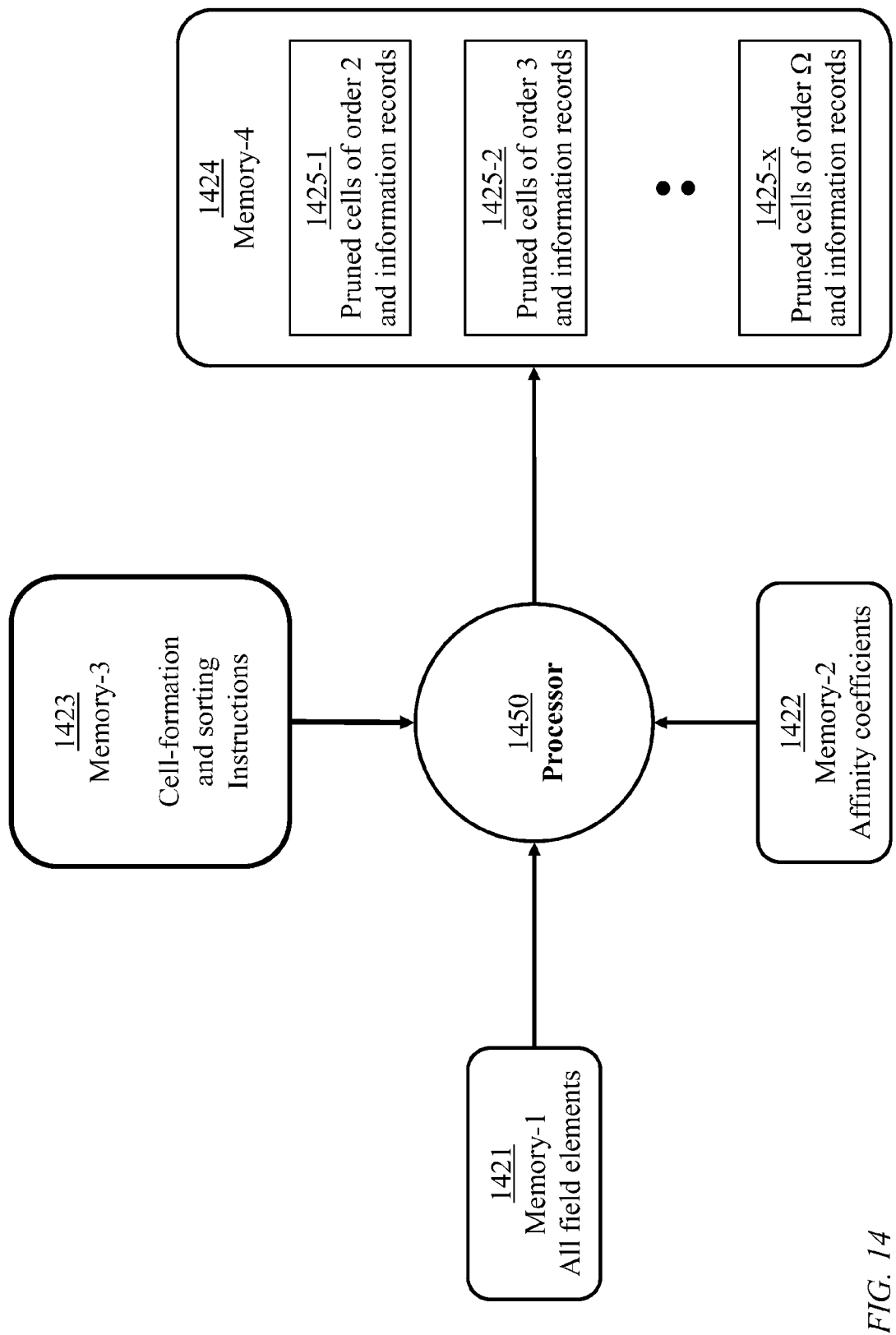
FIG. 14 illustrates an apparatus for generating pruned cell arrays of ascending order, in accordance with an embodiment of the present invention.

FIG. 14 illustrates an apparatus for generating pruned cell arrays of ascending order. The apparatus comprises a processor 1450, a memory device 1421 (memory-1) storing user-defined elements of a selected information domain 120, a memory device 1422 (memory-2) storing user defined affinity coefficients for element pairs, a memory device 1423 (memory-3) storing processor-executable instructions which cause the processor 1450 to form sets of cells of different orders, and a memory device 1424 (memory-4) storing sets of formed cells. The sets of formed cells are pruned to retain only cells each having an affinity parameter exceeding a pre-defined threshold.

The instructions stored in memory device 1423 cause the processor 1450 to recursively form cells of order 2 generated from elements stored in memory 1421, followed by cells of order 3 generated from cells of order 2 and elements stored in memory 1421, followed by cells of order 4 generated from cells of order 3 and elements stored in memory 1421, and so on, until cells of a specified order $\Omega$ are reached. As illustrated, Memory 1424 stores a set 1425-1 of cells of order 2, a set 1425-2 of cells of order 3, and a set 1425-x of cells of order $\Omega$. The instructions stored in memory device 1423 may also cause the processor 1450 to sort the cells within each set 1425 according to affinity parameters.

Memory device 1423 may store instructions which cause the processor 1450 to acquire information records from information sources for each created cell, starting with a cell of a highest affinity parameter. In order to ensure that information records corresponding to cells of high affinity parameters can be accommodated in memory device 1424, given a constrained storage capacity of memory device 1424, all acquired information records are preferably held in an auxiliary storage medium of high capacity. If the size of all acquired information records does not exceed the storage capacity of memory device 1424, then all information records are transferred from the auxiliary storage medium to memory device 1424. Otherwise, information records may be selectively transferred from the auxiliary storage to memory device 1424.

Memory device 1423 may also store instructions which cause the processor 1450 to determine intersections of indices of information records corresponding to cells having less than $\nu$ elements each, where $\nu$ is less than a specified limit, to produce indices of information records corresponding to cells each having at least $\nu$ elements. For example, common information records corresponding to two cells of order 4 may serve as information records corresponding to a cell of order 5.

Memory device 1423 may also store instructions which cause the processor 1450 to monitor occupancy of memory device 1424 and, where the occupancy reaches a specified occupancy limit, information records of lowest affinity parameters may be deleted.

Although FIG. 14 illustrates four memory devices 1421, 1422, 1423, and 1424, it is understood that the content of any combination of the four memory devices may be placed in a single shared memory device. In other words, two or more of the four memory devices may optionally be implemented as partitions of a shared memory device.

On the other hand, it may be desirable to place the content of memory device 1424 in two separate memory devices. Memory device 1424 contains both cell descriptors and corresponding information records and it may be beneficial to place the cell descriptors in a separate memory device.

The apparatus of FIG. 14 may also comprise a memory device (not illustrated) storing a list of pre-defined queries.

Likewise, the content of any combination of the four memory devices 621, 622, 623, and 624 of FIG. 6 may be stored in a single shared memory device. Thus, two or more of the four memory devices may optionally be implemented as partitions of a shared memory device. Conversely, the descriptors of the sorted user-defined cells and the corresponding information records may be stored in separate memory devices instead of the single memory device 624.

Figure 15:
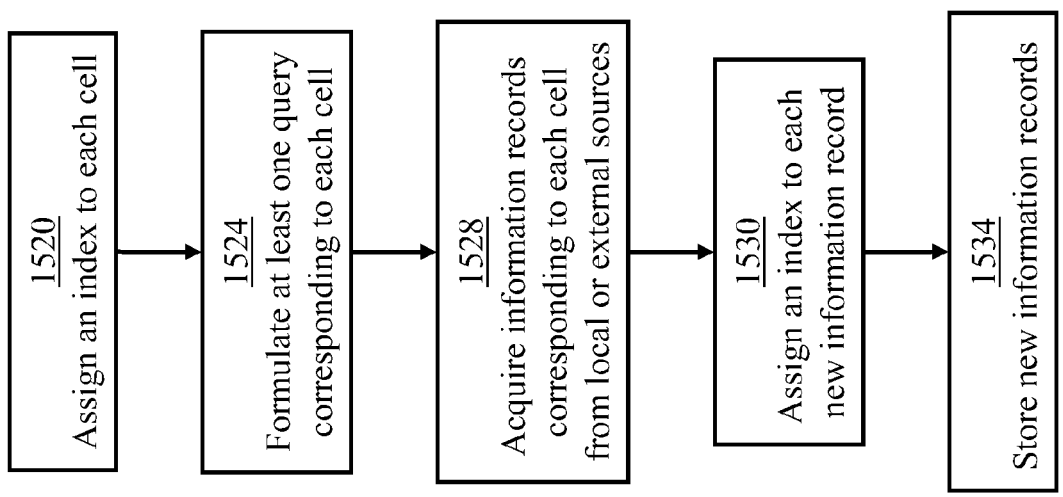
FIG. 15 illustrates a process of acquiring and storing information records corresponding to pruned cells, in accordance with an embodiment of the present invention.

FIG. 15 illustrates a process implemented by processor 1450 for acquiring and storing information records corresponding to pruned cells stored in memory device 1424 of FIG. 14.

In step 1520, each cell is assigned a unique index. In step 1524, at least one query is formulated to correspond to each cell. Memory device 1423 has stored thereon instructions which cause processor 1450 to acquire information records from local or external sources (step 1528). Each new information record is assigned a respective unique index (step 1530) and the new information record is stored in memory 1424 (step 1534). An acquired record may be included in a response to more than one query associated with more than one cell.

Figure 16:
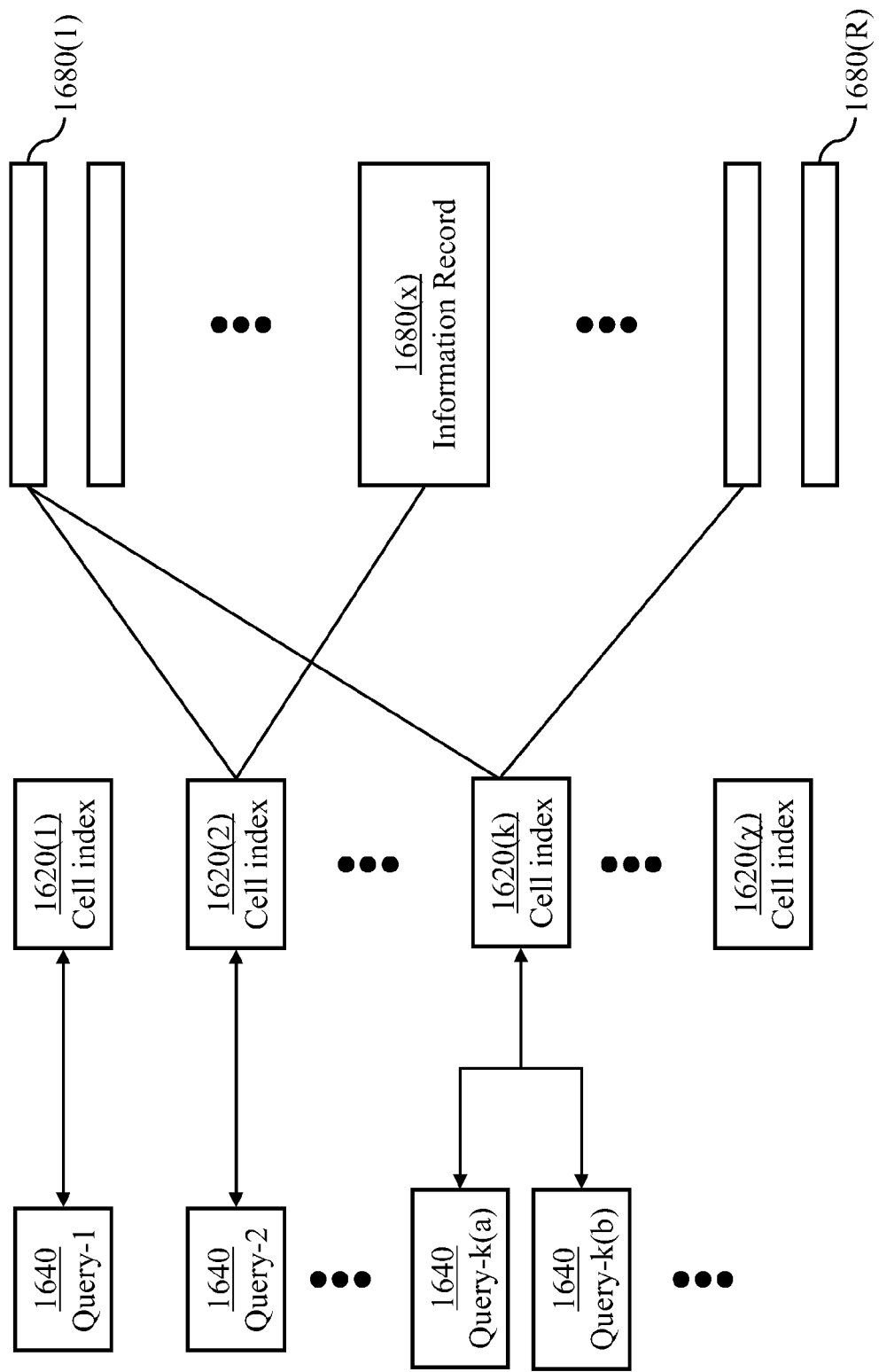
FIG. 16 illustrates inter-relationships of queries, cell indices, and information records, for use in an embodiment of the present invention.

FIG. 16 illustrates a list of queries 1640, and a number, $\chi$, $\chi>1$, of cells, each cell having a respective unique index 1620. Several queries of different syntax may be associated with one cell. As illustrated in FIG. 16, cell 1620(k) is associated with two queries. The information records 1680 are assigned unique indices. An information record 1680 may be included in responses of queries associated with more than one cell. As illustrated, two cells of indices 1620(2) and 1620(k) are assigned information record 1680(1).

Figure 17:
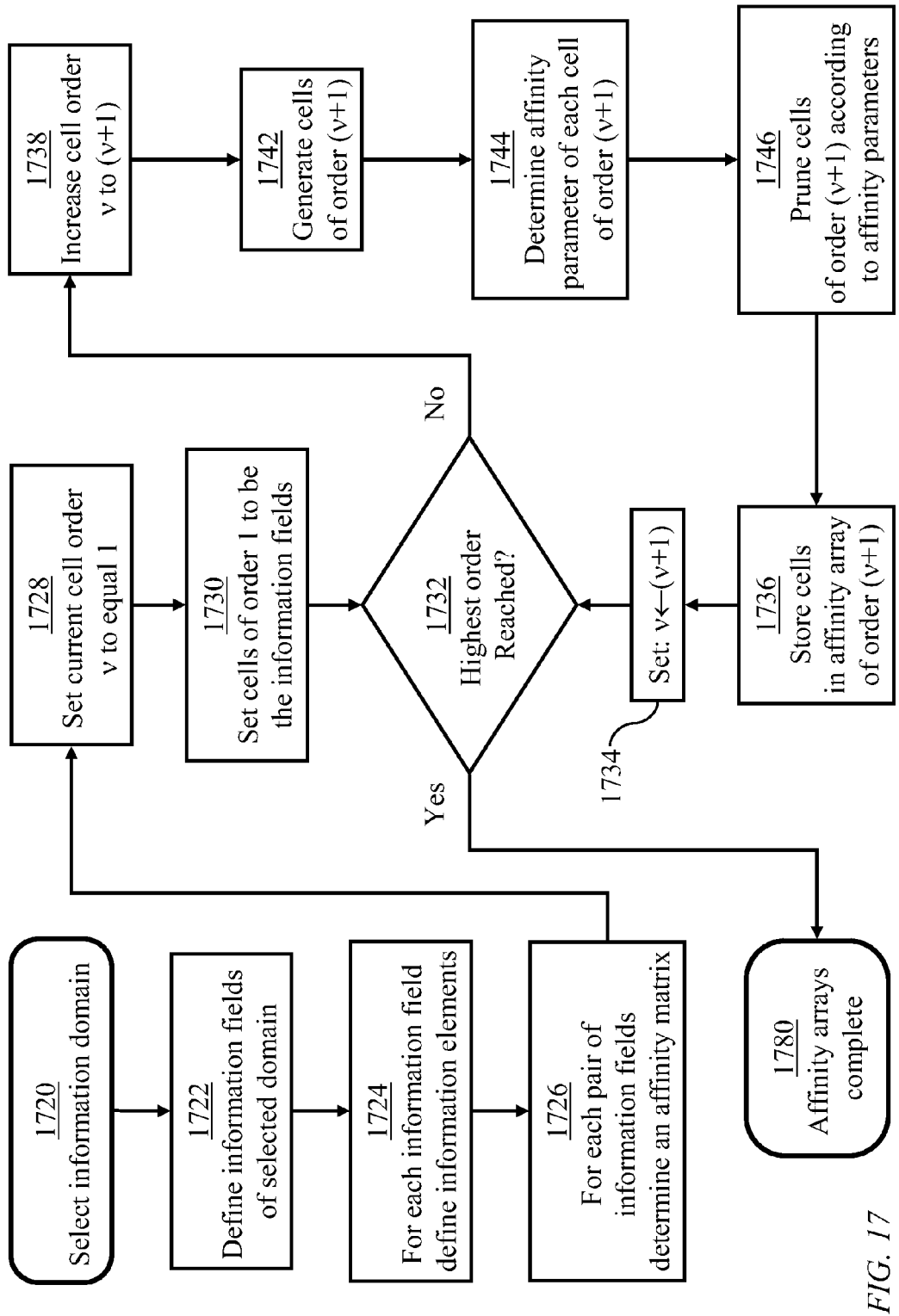
FIG. 17 is a flow chart illustrating a method of selective information storage based on generating pruned cell arrays of ascending order, in accordance with an embodiment of the present invention.

FIG. 17 is a flow chart illustrating a method of generating pruned sets of cells of ascending order implemented by the apparatus of FIG. 14. The method is encoded in the instructions stored in memory 1423. The method may apply to any of information domains 120.

In step 1720, an information domain 120 is selected. In step 1722 information fields 140(1), 140(2), . . . , 140(M), of the selected information domain are defined. The number, M, of fields and the content of each field may be user defined at input or acquired from a computer-readable information-storage medium. In step 1724, information elements specific to each field are defined. The elements belonging to each field may be user defined or acquired from a respective computer-readable information-storage medium. In step 1726, an affinity matrix is generated for each pair of fields as described with reference to FIG. 9 and FIG. 10. An affinity matrix may also contain affinity coefficients of each pair of elements of the same field. The affinity matrix is then labeled an "auto affinity matrix". An auto-affinity matrix may be determined for each single field. The total number of affinity matrices each corresponding to a pair of fields is $M\times(M-1)/2$. With M=32, for example, the number of affinity matrices would be 496 and the number of auto-affinity matrices is 32. The number of elements may vary from one field to another. For example, the number of elements in a field containing selected country names (information elements of a field) may exceed 100 while the number of elements in a field containing specific products may be much less. An affinity matrix of two fields contains affinity coefficients for each pair of elements; one from each field. An affinity matrix of two fields having $n_1$ and $n_2$ elements contains $n_1 \times n_2$ affinity coefficients. An auto-affinity matrix of a field having n elements contains $n \times (n-1)/2$ affinity coefficients. It is plausible that the affinity matrices and auto-affinity matrices be sparse matrices where a large proportion of entries would be inconsequential and may be set to equal zero. Methods of storing and addressing sparse matrices are well known in the art.

In step 1728, an integer variable v indicating current cell order is set to equal 1. A cell of order 1 is simply a single element and is defined as such in step 1730. In step 1732, the current order is compared with a pre-defined upper bound $\Omega$. The value of $\Omega$ is user defined. With the number, M, of fields being 32, for example, the maximum number of elements in a cell (the highest cell order $\Omega$) may be limited to 8.

If the current order v is less than or equal to $\Omega$, the cell order v is increased by 1 in step 1728. In step 1742, cells of order (v+1) are generated from cells of order v and elements acquired in step 1724 as described above with reference to FIG. 11 and FIG. 12. In step 1744, an affinity parameter is determined for each formed cell of order (v+1). Cells of affinity parameters each exceeding a pre-defined threshold are retained, as indicated in step 1746 and step 1736, and used in generating cells of a higher order. In step 1734, the value of the current order is updated. If step 1732 indicates that the current order equals the pre-defined upper bound $\Omega$, the process of generating the affinity sets is considered complete.

The method illustrated in FIG. 17 may be implemented in a special-purpose apparatus or in a general-purpose computing device.

FIGS. 18-22 illustrate a Data Query Processing Module which receives the necessary inputs from the user via an input device such as a computer keyboard and mouse, or another processing system via an interface or data file, and produces the necessary outputs.

Data Query Processing Module

The Data Query Processing Module 1800 is typically embodied in software running on a computer which receives the necessary inputs from the user via an input device such as a computer keyboard and mouse, and produces the necessary outputs. Alternatively the Data Query Processing Module could receive inputs from another processing module typically embodied in software running on a computer.

Inputs received by the Data Query Processing Module may include Query Definition 1802 which provides updates to the list of pre-defined queries, and may include the input of new queries, input of query changes and deletion of previously submitted queries. Inputs received by the Data Query Processing Module may also include Query 1803 which includes one or more data queries to be processed. Inputs received by the Data Query Processing Module may also include Configuration and Miscellaneous Inputs 1806 which include one or more data items used to configure the operation of the Data Query Processing Module.

Processing based on these inputs produces a series of outputs. One output is the Query Results 1804 which provides the results of the Queries submitted.

The Data Query Processing Module could be implemented in hardware, software, or firmware. Inputs could be received via various methods including a human-computer interface or via data file or another processing system. Outputs could be presented via various methods, including a human-computer interface or via data file.

The Query Results Cache 1801 is typically embodied in the Data Query Processing Module. The Query Cache receives inputs from the Data Query Processing Module including pre-defined query results for storage as well as requests for retrieval of previously stored pre-defined query results. Outputs from the Query Results Cache to the Data Query Processing Module include query results based on the data query requested.

The Database may be embodied in the Data Query Processing Module or be embodied separately. The Database receives inputs from the Data Query Processing Module including data queries. Outputs from the Database to the Data Query Processing Module include corresponding data query results.

Each of the components Query Results Cache 1801, Pre-Defined Query List 1807, and Database 1805 may be contained within the Data Query Processing Module 1800.

Alternatively, each of the components Query Results Cache 1801, Pre-Defined Query List 1807, and Database 1805 may be contained within the Database 1805, or all may be separate entities. In a further embodiment the Query Results Cache 1801 may not be used.

The processes of FIGS. 18 to 22 may run independently and may run in parallel.

The Data Query Processing Module 1800 determines the required outputs through processes 1900, 2000, 2100, and 2200 illustrated in FIGS. 19, 20, 21, and 22.

Process 1900 commences with the retrieval of an input 1901. The input can be received from sources that could include a human-computer interface or a data file read from a computer hard drive, or an input from another processing module.

Figure 18:
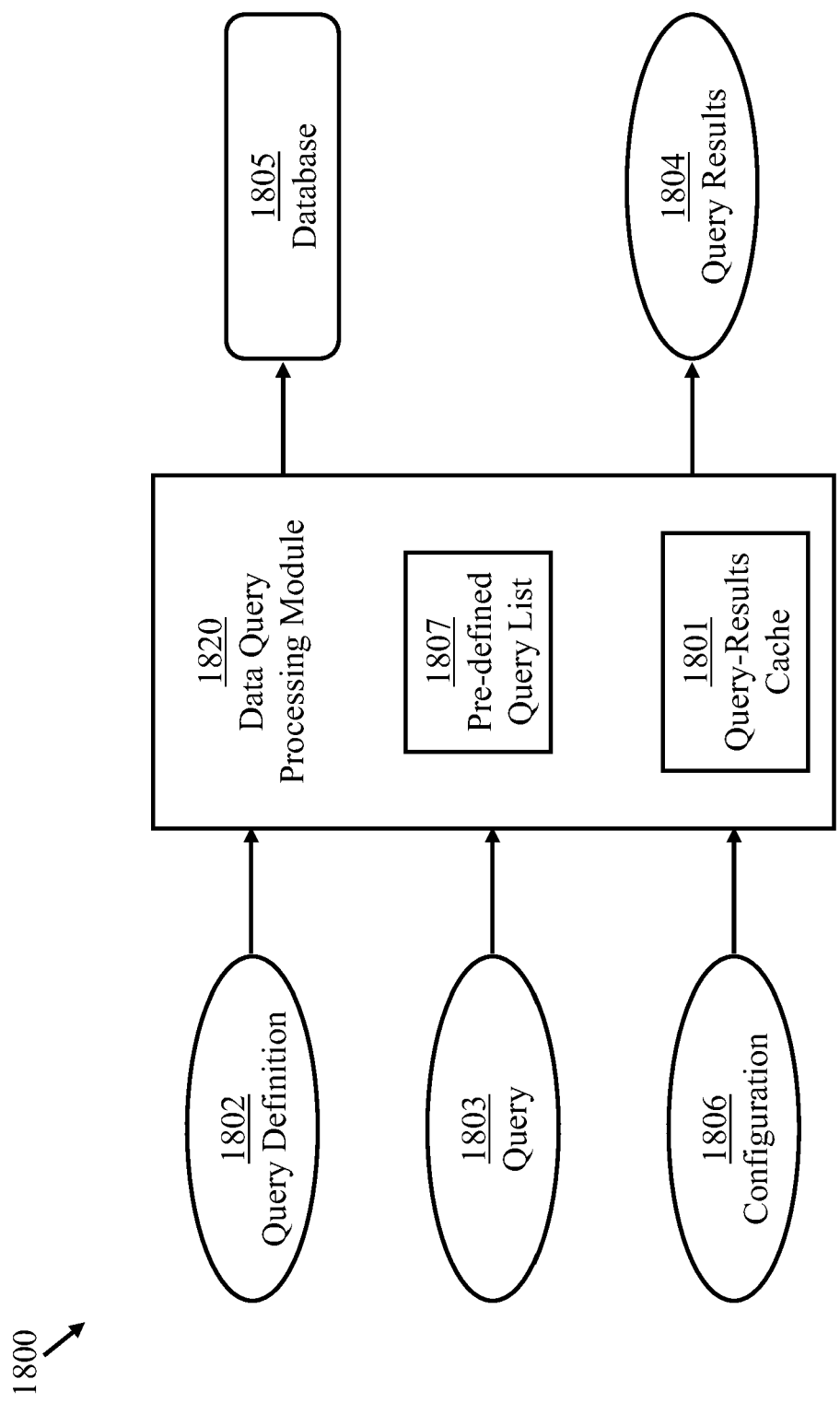
FIG. 18 illustrates a data query processing module indicating basic inputs and outputs, in accordance with an embodiment of the present invention.
Figure 21:
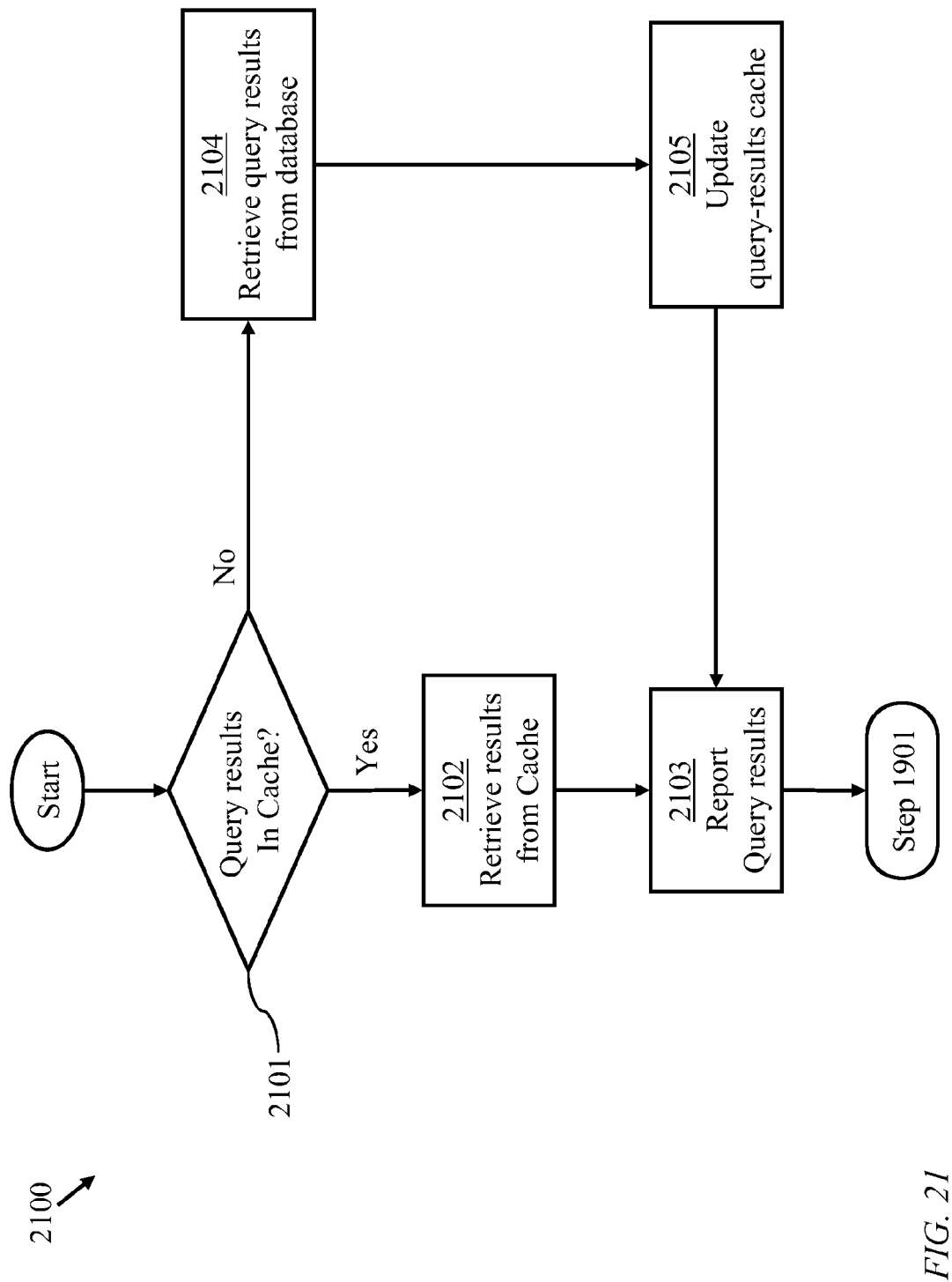
FIG. 21 illustrates a process of responding to a data query request, in accordance with an embodiment of the present invention.

If an input tested at 1902 is a Query 1803, then it is tested in step 2101 of FIG. 21 to confirm if it is a pre-defined query with the results in the Query Cache 1801. If the query results exist in the Query Cache, then the results are read from the Query Cache 1801 at step 2102 of FIG. 21. Retrieving results also will update the Query Results Cache 1801 to reflect the retrieval of results on the cache configuration, based on any of the numerous caching algorithms known in the art. Query Results are returned (step 2103) as Query Results 1804 (FIG. 18).

If the Query Cache does not contain results for the Query, then the query results are obtained from the Database 1805 and the Query Cache 1801 is updated at step 2105, based on any of the numerous caching algorithms known in the art. Results are returned (step 2103) as an output 1804 (FIG. 18).

Figure 22:
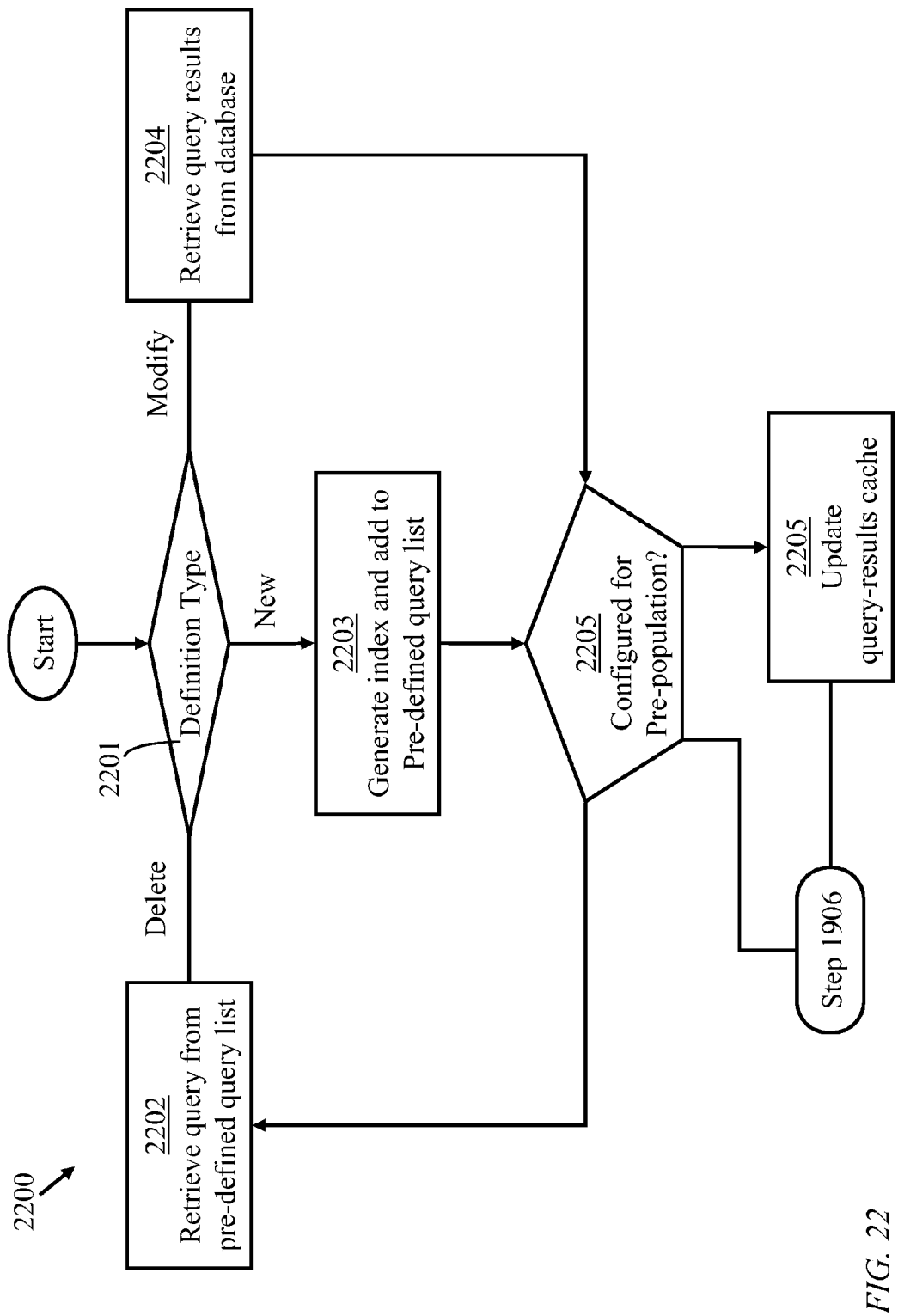
FIG. 22 illustrates a process of responding to a pre-defined query definition, in accordance with an embodiment of the present invention.

The input is tested in step 1905 and if it is determined to be one or more Query Definitions 1802 then the operation passes to step 2200 of FIG. 22 and the Query Definition is tested at 2201 to determine if it is a new Pre-Defined Query, an updated to an existing Pre-Defined Query, or a request to delete an existing Pre-Defined Query.

If the Query Definition submission is an existing Pre-Defined Query and the input is a request to delete the Query, then it is removed from the Pre-Defined Query List 1807 at 2202. If the Query Definition is a new Query, then a unique Index is calculated and the Query is added to the Pre-Defined Query List 1807 at 2203. If the Query Definition is an update to an existing Pre-Defined Query, then a Query is updated in the Pre-Defined Query List 1807 at 2204.

With an updated Pre-Defined Query List 1807, if the configuration of the Data Query Processing Module 1800 has been set with inputs 1806 to pre-populate the Query Results Cache 1801, as tested at 2205, then the Query Results Cache 1801 is updated. If the Query Results Cache 1801 is configured to update with a deleted Pre-Defined Query, as tested at 2201, then the Query Results Cache 1801 is updated. If the Query Results Cache 1801 is configured to update with a New Pre-Defined Query, as tested at 2201, then the Query Results Cache 1801 is updated. If the Query Results Cache 1801 is configured to update with a Modified Pre-Defined Query, as tested at 2201, then the Query Results Cache 1801 is updated.

The specific manner in which the Query Results Cache 1801 will be updated is based on any of the numerous caching algorithms known in the art (for example, Belady's Algorithm, Least Recently Used, Most Recently Used, Pseudo-LRU, Segmented LRU, etc . . . ).

Figure 19:
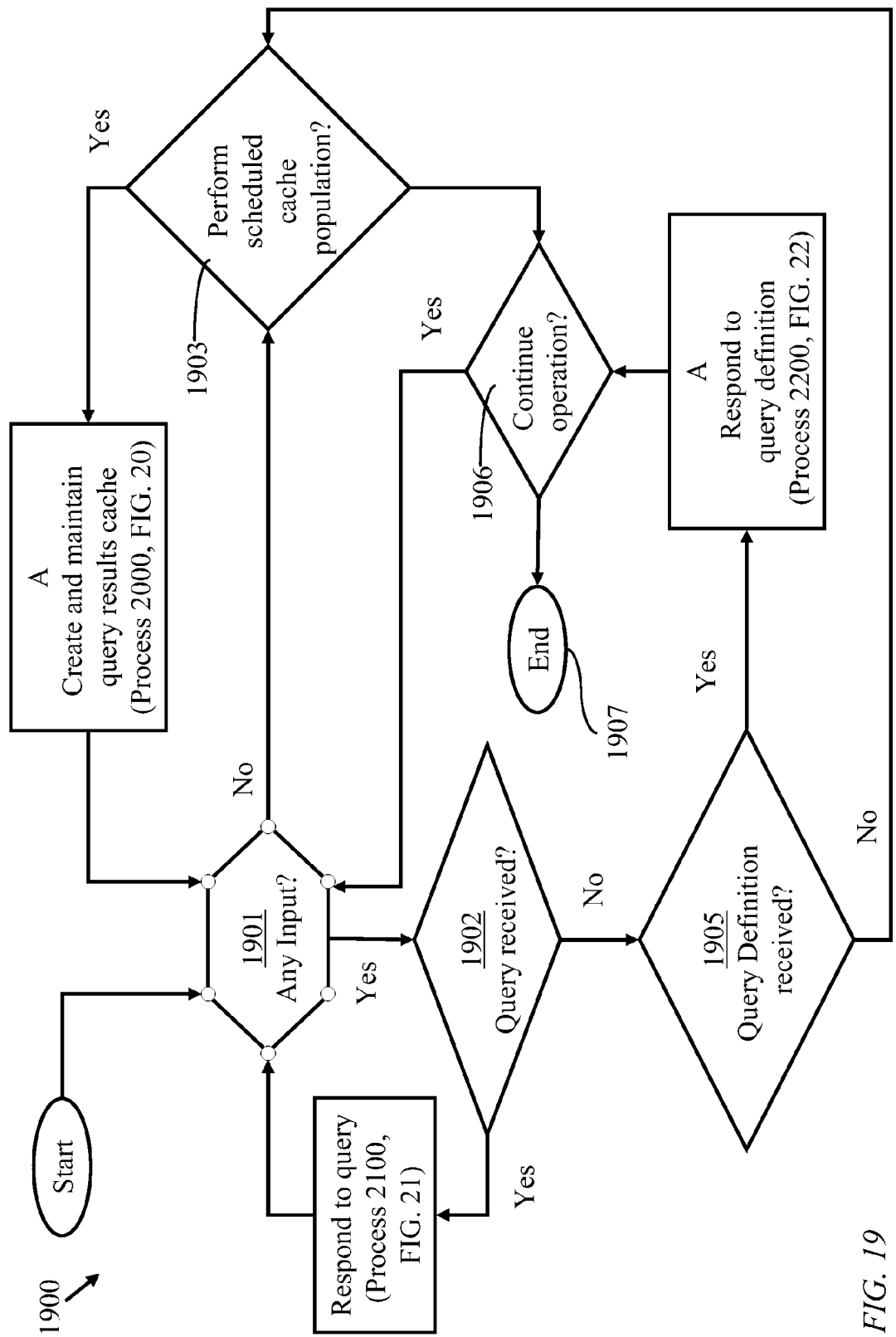
FIG. 19 illustrates a process of creating and maintaining a pre-defined query List, in accordance with an embodiment of the present invention.

Following completion of the Query Results Cache update at 2206, or if no pre-population is configured for the Query Results Cache 2206, as tested at 2205, then step 2207 directs the operation to step 1906 of FIG. 19.

Scheduled Cache Population

Figure 20:
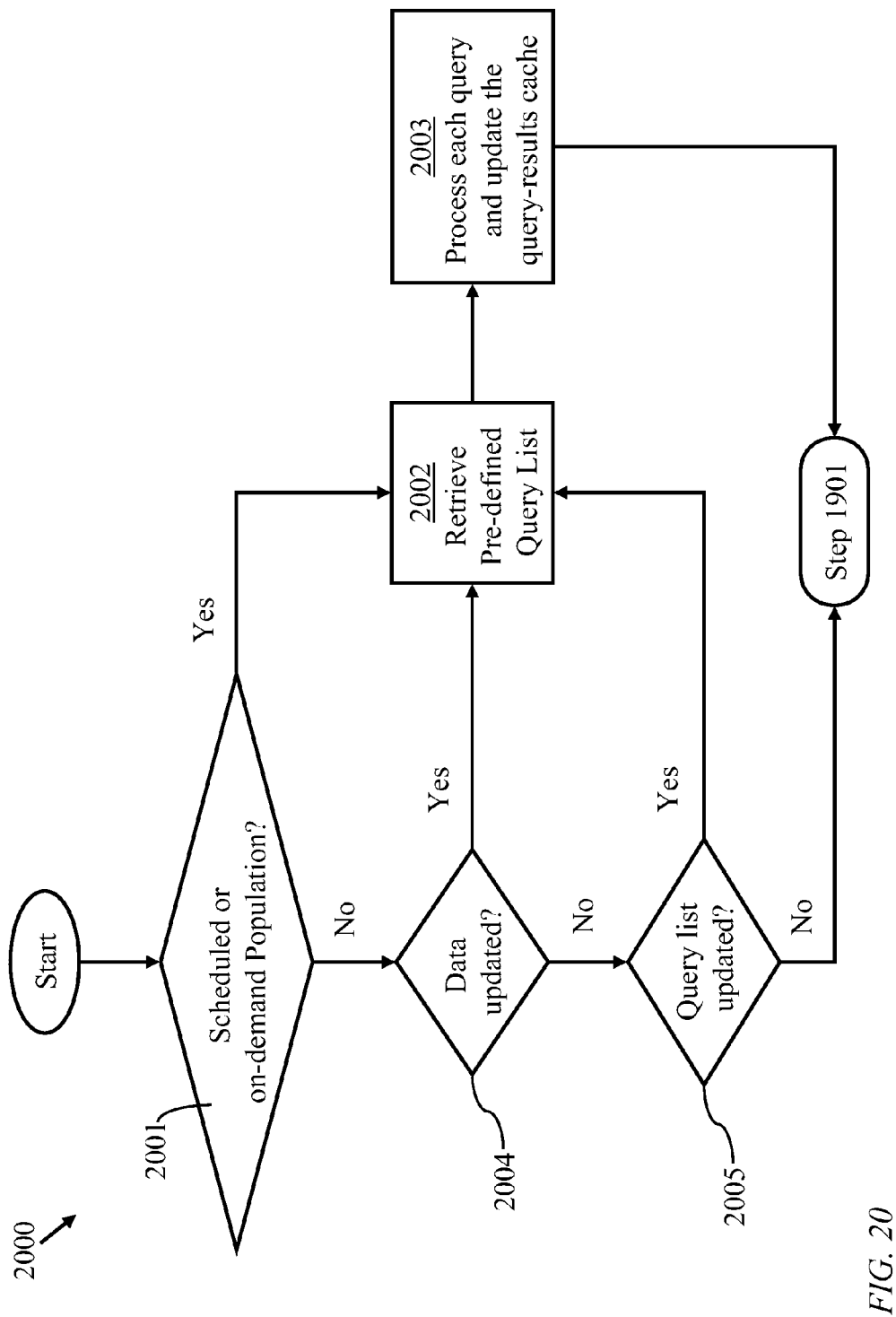
FIG. 20 illustrates a process of creating and maintaining a query results cache, in accordance with an embodiment of the present invention.

If there is no input at 1901, or operation continues from 1902, then operation passes from step 1903 to step 2000 (FIG. 20).

If the Data Query Processing Module has been configured through inputs 1806 to refresh the cache (step 2001) on demand or a predetermined schedule and the specified interval has been reached, then the list of Pre-Defined Queries 1807 is retrieved from the Data Query Processing Module (step 2002) and the results from each query obtained from the Database and used to update the Query Results Cache 1801 at step 2003 based on any of the numerous caching algorithms known in the art. Operation then continues, awaiting subsequent input 1901.

If the Data Query Processing Module has been configured through inputs 1806 to monitor changes to data elements in the Database 1805 and database data has changed such that it impacts the results of queries in the Pre-Defined Query List 1807, then those impacted queries are determined from the Pre-Defined Query List (step 2002) and the results from each impacted query is obtained from the Database 1805. The results are used to update the Query Results Cache 1801 at step 2003 based on any of the numerous caching algorithms known in the art. The operation then continues, awaiting subsequent input 1901.

If the Data Query Processing Module has been configured through inputs 1806 to monitor changes to the Pre-Defined Query List 1807, then if a pre-defined query has been added or modified, then the impacted query is determined from the list of Pre-Defined Queries (step 2002) and the results from each impacted query obtained from the Database 1805 and the results used to update the Query Results Cache 1801 at step 2003 based on any of the numerous caching algorithms known in the art. Operation then continues, awaiting subsequent input 1901.

Pre-Defined Query Caching

In a web-based system with constrained resources, it is important to ensure that information requested is presented to a browser with minimal response time. As latency increases, transactions may be subject to abandonment.

Sophisticated content delivery mechanisms often rely on real-time submission of content requests that result in database queries for the requested content. As the database of content grows, the time required to process such queries increases. In addition, queries may involve multiple criteria for determining content to be returned which also increases processing requirements.

Several caching approaches are known in the art which improve performance by keeping a subset of possible query responses ready for immediate return in response to the matching query. A variety of mechanisms which rely on past query history are employed (recency, popularity, etc . . . )

Certain web-based applications may be based on a complex database of content and associated queries for delivery of the content over the web. There is a further subset of these applications where, while the content database and queries may be complex, the number and nature of individual queries are limited and can be known in advance of their submission. In these cases a novel way of managing the database cache can lower the risk of query results not being in the cache, thus improving performance of the system.

For example, a web based application can exist which includes numerous different web pages, each of which including web based content that is drawn from a content database and presented to the user when they browse to that page.

The query to draw the relevant content for each page may be different for some, or all, pages. For example, the query for a given page may request a video or image to be shown that has certain categorizations (for example, a picture may be requested that is of a "person" versus other subject matter, that was taken in a certain country, "United States" and has certain characteristics "color").

Each page could have a different query, for example, requesting a picture with different characteristics.

Because each query is known in advance as it is embedded in the web page design and then published to the web site, it is possible to accumulate a list of all the potential queries as they are known for each and every page on the site.

As the queries are known, a list of queries may be assembled and, even prior to a single visit to a web page, the queries can be exercised and the results placed in a database cache.

As such, when an individual browses to that web page, the query results have been already established and loaded into the database cache. Since all queries are known in advance, the results have already been calculated and, thus, the resultant content can be delivered with little delay for query result calculation.

Existing approaches include use of caching servers and predictive caching.

With caching servers, several solutions use known caching algorithms. These all rely on past query historical data and a potential query set that is above and beyond what may be contained in the cache. With predictive caching, some solutions exist that attempt to predict what queries will be most likely to be received. These predictive algorithms are based on past, related queries and cannot provide guarantee cache population of a given query.

Pre-Defined Query Indexing

Web applications typically require the deployment of specific web pages of content. Once web pages are deployed there can be several impediments to updating them, including technical difficulties (risk in changing content that could create errors or undesirable on-line behaviour) and business considerations (time and cost).

In cases where content is served to a given web page using queries (database queries that return requested web content for display), there exist two methods to change the content being displayed:

The first method updates the database query embedded on the web page. This impacts the web page which is undesirable. The second method changes the content that is returned by the database query. If the intent is to change the results of the query, then this is an acceptable method (to change the display of a company logo from an old version to the newer, simply change that image in the database).

However, if the intent is to display content that is a result of a different database query and not change the results of the original query, then doing so impacts the web page. For example, to update the web site from showing a current company logo to showing the picture of current company executives, this would require changing the web page code.

For many web applications, the scope of potential content database queries are substantial and many are not known in advance (that is, content is requested via query in real-time depending on what the requests or actions taken). Further, the scope of these potential queries is sufficiently large to cache for performance gains. That is the potential query results are substantially larger than what can practically fit in a database cache.

For web applications where the client queries can be pre-defined, those pre-definitions can be abstracted from the web page to allow query modification without impact to the web page itself. If a database query is predefined (for example, a query to return an image that is in color, that is of a particular size, and that shows the current company logo), it can be assigned a random and unique index, and that index is embedded into the web page content. So, when the page is viewed, the specific query exercised is requested via an index which is then evaluated at the server where it is resolved to the specific query (an image that is in color, that is of a particular size, and that shows the current company logo) that is submitted.

If it is desired to change the content displayed on that web page based on a new query, rather than defining a new query and changing it on that web page (which is undesirable as discussed above), a process for changing the query that is referenced by the index allows for the query to be updated to provide new results (for example, to return color images of a certain size of company executives), without changing the original query results nor having to touch the web page.

So to reiterate the example, the initial pre-defined query is given a unique identifier X, where X is the query to return database contents that are of the image data type, are color and are tagged for the category "company". A web page is constructed whereby the server is requested to exercise Query X, then the server retrieves the specific query elements associated with Query X and those are submitted to the database (or cache) in order to retrieve the results.

At a later time when it is desired to change a given web page to return the new content, Query X is updated at the server to reflect the new modified query elements (image data type, color and all of the images with category "executive headshot"). Thus the query is updated without impacting either the content or the web page.

Current content management approaches for web site rely on either changing the web page code itself for changing the query used to retrieve data elements from a content database or changing the target data itself.

The indexing of predefined queries allows for modification of web pages without changing the content or the web page and allows for the full leveraging of the pre-defined query caching approach as mentioned above.

Query Translation

In certain web applications, content is served based on queries to a server where the specific query is executed (or retrieved from cache) and presented to the user. There are several circumstances where the query becomes out of date and/or no longer returns the desired content elements for display:

1. The query is being formulated in part or in whole by an external system that is not under the control of the server fulfilling the query. For example, external reliance for this is often required due to technical reasons (processing capacity of the external system is much greater as required to provide the necessary return information and/or the data set is sufficiently large to not be practical to copy) or practical business reasons (the external data is proprietary). For example, in the case where a query has been pre-defined (e.g., to return up to three images in a category for a particular product, say "ProductX"). That query is further modified in real time by information about the client from an external system (for example, in the URL that was provided to the user, it contained the URL variable "banking" to indicate the customer is in a banking sector). Thus the query is formulated by combining the pre-defined query (return up to three images, in the category of ProductX and category "banking"). However, in the database of content to be provided in response to the query, there is no categorization whose value equals "banking"; it is simply "private sector" and "public sector". Therefore null results would be returned, which is undesirable.

2. The query is pre-defined and embedded in a web page using elements that have become obsolete. Assume a predefined query has been defined to return certain content elements (three images for a product category "ProductX"). Content is initially organized in these categories. Subsequently product category "ProductX" is merged with category "ProductY" and all content subsequently re-categorized into "ProductY". Given it is often undesirable to update a web page (as discussed previously), a pre-defined query that referenced "Product X" will not return any results as elements formally categorized as "Product X" have been re-categorized as "Product Y".

3. Content associated with a query has changed such that a minimum acceptable number of matching results are not found. For example, a web page may have a predefined query embedded to display certain content elements (three images of company logos representing customers from a particular country, "Sweden"). Subsequently, the three customers cease to use the product and their associated image is removed from the database contents. However, due to the technical challenges in updating web pages, the pre-defined query may exist for a period of time, and query results providing no images which may be considered an unacceptable outcome.

4. A forth scenario could be in cases where the client submitting the query is detected to have characteristics for which some query translation would be desirable (e.g., video to image). However, per our previous conversation, this will not be pursued further.

Given the sensitivity to delays in rendering web content and resulting web-transaction abandonment rates, any solution to these problems must not impart undue latency during the translation process.

Certain web-based applications may be based on a complex database of content and associated queries for delivery of the content over the web. There is a further subset of these applications where while the content database and queries may be complex, the number and nature of individual queries are limited and can be known in advance of their submission. In these cases a novel way of defining a translation scheme for query elements can be established to improve the delivery of desired content returns.

Current mechanisms for these issues must account for a virtually unlimited number of potential translation pairs. One approach is to "guess" what a user is seeking. In the case where the number of potential queries is limited, this allows the issues with particular queries to be identified and addressed in advance of receiving a query. This also allows a significant advantage in the processing required to perform query translation which reduces the resource requirements, latency and other technical challenges.

In addition, this permits the web site operator to control what is shown to the end user in response to a query that is subject to one of the state problems—a very different objective than for traditional search engines.

Evaluation of a Combination of Pre-defined and Real-Time Queries

As described above, Pre-Defined Queries have a number of advantages. However, there are some limitations. In a system that relies only on Pre-Defined Queries, there is no opportunity for further refining the query before evaluation. This minimizes the opportunity for personalization on a given web page for certain applications.

For example, a web page may have an embedded query to request three images of company logos of those that use a particular product. It would be desirable to detect additional attributes about the user on the web page that could be used to refine the query. An example would be using IP-Geography location techniques to determine the user's country of origin, or using a URL variable to arrive at the page that indicates the type of company to which the user belongs.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method, implemented by a processor, of judicially storing processing information of an information domain, selected from a plurality of information domains, in a processor-readable medium, the method comprising:
defining a set of information fields of said information domain;
identifying a set of elements within each information field in said set of information fields;
determining affinity coefficients of at least two elements belonging to at least two fields;
generating a set of second-order cells, each second-order cell containing two elements;
determining an affinity parameter of said each second-order cell as an affinity coefficient of said two elements;
pruning said set of second-order cells to produce a pruned second-order cell set containing accepted second-order cells each of an affinity parameter exceeding a predefined affinity threshold; and
acquiring second-order information records corresponding to each accepted second-order cell; and
storing said second-order information records, identifiers of said each accepted second-order cell, and a respective affinity parameter in said processor-readable medium.

2. The method of claim 1 further comprising:
selecting a specific element from a specific information field among said set of information fields;
selecting a specific second-order cell from said pruned second-order cell set;
determining a first affinity coefficient of said specific element and a first element of said specific cell;
determining a second affinity coefficient of said specific element and a second element of said specific cell;
creating a third-order cell containing said specific cell and said specific element;
determining an affinity parameter of said third-order cell as a least value of said first affinity coefficient, said second affinity coefficient, and an affinity parameter of said specific second-order cell; and
responsive to an indication that said affinity parameter of said third-order cell exceeds said predefine affinity threshold, acquiring third-order information records corresponding to said third-order cell; and
storing said third-order information records, identifiers of said third-order cell, and said affinity parameter of said third-order cell in said processor-readable medium.

3. The method of claim 2 further comprising storing said third-order information records, identifiers of said third-order cell, and said affinity parameter of said third-order cell in at least one non-transitory processor-readable storage medium.

4. The method of claim 2 further comprising:
sorting said second-order cells according to a descending value of said affinity parameter of said each second-order cell; and
sorting said third-order cells according to a descending value of said affinity parameter of said each third-order cell.

5. The method of claim 1 further comprising:
for all $v$-order cells, $1 < v \leq \Omega$, $\Omega$ being a predefined limit of $v$, and starting with $v=2$:
selecting specific elements from specific information fields among said set of information fields;
computing, for each specific element, a respective proximity to each $v$-order cell, starting with $v=2$;
creating, where said respective proximity exceeds said predefined affinity threshold, a $(v+1)$-order cell containing said each $v$-order cell and said each specific element;
determining an affinity parameter of said $(v+1)$-order cell as a lesser value of said proximity and an affinity parameter of said each $v$-order cell;
acquiring $(v+1)$-order information records corresponding to said $(v+1)$-order cell; and
storing said $(v+1)$-order information records, identifiers of said $(v+1)$-order cell, and said affinity parameter of said $(v+1)$-order cell in said at least one non-transitory processor-readable storage medium; and
recursively repeating said selecting, computing, creating, determining, acquiring, and storing, with integer $v$ increased by unity, until $v=\Omega$.

6. The method of claim 5 further comprising categorizing said second-order information records and said $(v+1)$-order information records, $2 < v < \Omega$, according to content type, said content type being one of a text, a still image, an audio recording, and a video recording.

7. The method of claim 5 further comprising associating indices with said information records and determining intersections of indices of information records of order 2 to $v$, $v > 2$, to produce indices of information records of cells of order higher than $v$.

8. The method of claim 5 further comprising, where storage capacity of said at least one non-transitory processor-readable storage medium is insufficient to hold said $(v+1)$-order information records, increasing a value of said predefined affinity threshold.

9. The method of claim 5 further comprising monitoring occupancy of said at least one non-transitory processor-readable storage medium and deletion of information records of lowest affinity parameters in response to an indication that said occupancy has reached a specified occupancy limit.

10. The method of claim 5 further comprising associating each said $v$-order cell with at least one query selected from a list of predefined queries.

11. The method of claim 1 further comprising storing said second-order information records, identifiers of said each accepted second-order cell, and a respective affinity parameter in at least one non-transitory processor-readable storage medium.

12. The method of claim 1 further comprising recursively forming higher-order cells of cell-orders exceeding two, starting with said set of second-order cells, and determining an affinity parameter of each said higher-order cell.

13. The method of claim 12 further comprising generating for each said higher order cell a cell descriptor indicating a respective number of elements, a respective affinity parameter, and pointers to relevant information records stored in a memory device.

14. A system for judicially processing information of an information domain, selected from a plurality of information domains, the system comprising:
    a processor;
    at least one non-transitory computer readable storage medium, having computer readable instructions stored thereon for execution by the processor, causing the processor to:
    define a set of information fields of said information domain;
    identify a set of elements within each information field in said set of information fields;
    determine affinity coefficients of at least two elements belonging to at least two fields;
    generate a set of second-order cells, each second-order cell containing two elements;
    determine an affinity parameter of said each second-order cell as an affinity coefficient of said two elements;
    prune said set of second-order cells to produce a pruned second-order cell set containing accepted second-order cells each of an affinity parameter exceeding a predefined affinity threshold; and
    acquire second-order information records corresponding to each accepted second-order cell.

15. The system of claim 14, wherein said computer readable instructions are configured to further cause the processor to store said second-order information records, identifiers of said each accepted second-order cell, and a respective affinity parameter in said at least one processor-readable storage medium.

16. The system of claim 14 wherein said computer readable instructions are configured to further cause the processor to:
    select a specific element from a specific information field among said set of information fields;
    select a specific second-order cell from said pruned second-order cell set;
    determine a first affinity coefficient of said specific element and a first element of said specific cell;
    determine a second affinity coefficient of said specific element and a second element of said specific cell;
    create a third-order cell containing said specific cell and said specific element;
    determine an affinity parameter of said third-order cell as a least value of said first affinity coefficient, said second affinity coefficient, and an affinity parameter of said specific second-order cell; and
    responsive to an indication that said affinity parameter of said third-order cell exceeds said predefine affinity threshold, to acquire third-order information records corresponding to said third-order cell.

17. The system of claim 16, wherein said computer readable instructions are configured to further cause the processor to store said third-order information records, identifiers of said third-order cell, and said affinity parameter of said third-order cell in said at least one processor-readable storage medium.

18. The system of claim 16 wherein said computer readable instructions are configured to further cause the processor to:
    sort said second-order cells according to a descending value of said affinity parameter of said each second-order cell; and
    sort said third-order cells according to a descending value of said affinity parameter of said each third-order cell.

19. The system of claim 14 wherein said computer readable instructions are configured to further cause the processor to:
    for all v-order cells, $1<v\leq\Omega$, $\Omega$ being a predefined limit of v, and starting with v=2:
    select specific elements from specific information fields among said set of information fields;
    compute, for each specific element, a respective proximity to each v-order cell, starting with v=2;
    create, where said respective proximity exceeds said predefined affinity threshold, a (v+1)-order cell containing said each v-order cell and said each specific element;
    determine an affinity parameter of said (v+1)-order cell as a lesser value of said proximity and an affinity parameter of said each v-order cell;
    acquire (v+1)-order information records corresponding to said (v+1)-order cell; and
    store said (v+1)-order information records, identifiers of said (v+1)-order cell, and said affinity parameter of said (v+1)-order cell in at least one processor-readable storage medium; and
    recursively repeat said select, compute, create, determine, acquire, and store operations, with integer v increased by unity, until v=$\Omega$.

20. The system of claim 19 wherein said computer readable instructions are configured to further cause the processor to categorize said second-order information records and said (v+1)-order information records, $2<v<\Omega$, according to content type, said content type being one of a text, a still image, an audio recording, and a video recording.

21. The system of claim 19 wherein said computer readable instructions are configured to further cause the processor to associate indices with said information records and determining intersections of indices of information records of order 2 to v, v>2, to produce indices of information records of cells of order higher than v.

22. The system of claim 19 wherein said computer readable instructions are configured to further cause the processor to increase a value of said predefined affinity threshold, provided storage capacity of said processor-readable medium is insufficient to hold said (v+1)-order information records.

23. The system of claim 19 wherein said computer readable instructions are configured to further cause the processor to monitor occupancy of said at least one processor-readable storage medium and deletion of information records of lowest affinity parameters in response to an indication that said occupancy has reached a specified occupancy limit.

24. The system of claim 19 wherein said computer readable instructions are configured to further cause the processor to associate each said v-order cell with at least one query selected from a list of predefined queries.

25. The system of claim 14 wherein said computer readable instructions are configured to further cause the processor to recursively form higher-order cells of cell orders exceeding two, starting with said set of second-order cells, and determining an affinity parameter of each said higher-order cell.

26. The system of claim 25 wherein said computer readable instructions are configured to further cause the processor to generate, for each said higher-order cell, a cell descriptor indicating a respective number of elements, a respective affinity parameter, and pointers to relevant information records stored in a memory device.

27. A non-transitory computer readable storage medium comprising computer readable instructions stored thereon for execution by a processor, for judicially processing information of an information domain, selected from a plurality of information domains, causing the processor to:

define a set of information fields of said information domain;

identify a set of elements within each information field in said set of information fields;

determine affinity coefficients of at least two elements belonging to at least two fields;

generate a set of second-order cells, each second-order cell containing two elements;

determine an affinity parameter of said each second-order cell as an affinity coefficient of said two elements;

prune said set of second-order cells to produce a pruned second-order cell set containing accepted second-order cells each of an affinity parameter exceeding a predefined affinity threshold; and acquire second-order information records corresponding to each accepted second-order cell.

* * * * *